(12) United States Patent
Lee

(10) Patent No.: US 12,032,408 B2
(45) Date of Patent: Jul. 9, 2024

(54) DISPLAY DEVICE

(71) Applicant: Samsung Display Co., LTD., Yongin-si (KR)

(72) Inventor: Doohyun Lee, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 39 days.

(21) Appl. No.: 17/661,030

(22) Filed: Apr. 27, 2022

(65) Prior Publication Data

US 2022/0374045 A1 Nov. 24, 2022

(30) Foreign Application Priority Data

May 20, 2021 (KR) .......................... 10-2021-0065060

(51) Int. Cl.
*G06F 1/16* (2006.01)
(52) U.S. Cl.
CPC .......... *G06F 1/1643* (2013.01); *G06F 1/1616* (2013.01)
(58) Field of Classification Search
None
See application file for complete search history.

(56) References Cited

U.S. PATENT DOCUMENTS

| 9,798,359 | B2 | 10/2017 | Seo et al. |
| 10,863,641 | B2 | 12/2020 | Jeon et al. |
| 10,930,883 | B2 * | 2/2021 | Park ........................ G06F 1/203 |

FOREIGN PATENT DOCUMENTS

| CN | 111415586 A | 7/2020 |
| CN | 111445796 A | 7/2020 |
| KR | 10-2019-0065930 A | 6/2019 |
| KR | 10-2019-0073012 A | 6/2019 |
| KR | 10-1986617 B1 | 6/2019 |
| KR | 10-2019-0124844 A | 11/2019 |

* cited by examiner

*Primary Examiner* — Anthony Q Edwards
*Assistant Examiner* — Rashen E Morrison
(74) *Attorney, Agent, or Firm* — Lewis Roca Rothgerber Christie LLP

(57) ABSTRACT

A display device comprising: a display panel comprising a first non-folding area, a second non-folding area, and a folding area, wherein the display device is configured to operate in a first mode in an unfolded state, and the display device is configured to operate in a second mode in a folded state; an insulation plate under the display panel and comprising a folding portion corresponding to the folding area; and a digitizer under the insulation plate, the folding portion comprising: a first area; a second area; and a third area, wherein each of the first area and the third area comprises a first stress control pattern comprising first grooves defined in an upper surface of the insulation plate, and the second area comprises a second stress control pattern comprising at least one of second grooves or openings defined in a lower surface of the insulation plate.

23 Claims, 16 Drawing Sheets

DISPLAY DEVICE

CROSS-REFERENCE TO RELATED APPLICATION

The present application claims priority to and the benefit of Korean Patent Application No. 10-2021-0065060, filed on May 20, 2021, the entire content of which is hereby incorporated by reference.

BACKGROUND

1. Field

Aspects of some embodiments of the present disclosure relate to a display device.

2. Description of the Related Art

A display device generally includes a display area activated in response to electrical signals. The display device may also be configured to sense input applied thereto from the outside via the display area and, substantially simultaneously, displays a variety of images to provide information to users. In recent years, there has been a demand for display devices having display areas with various shapes.

The above information disclosed in this Background section is only for enhancement of understanding of the background and therefore the information discussed in this Background section does not necessarily constitute prior art.

SUMMARY

Aspects of some embodiments of the present disclosure relate to a display device. For example, aspects of some embodiments of the present disclosure relate to a foldable display device.

Aspects of some embodiments of the present disclosure include a display device capable of improving a flexibility of a folding area and including a support member with a set or predetermined rigidity.

Aspects of some embodiments of the inventive concept include a display device including a display panel, an insulation plate, and a digitizer. The display panel includes a first non-folding area, a second non-folding area, and a folding area between the first non-folding area and the second non-folding area, is unfolded in a first mode, and is folded in a second mode. The insulation plate is under the display panel and includes a folding portion corresponding to the folding area. The digitizer is under the insulation plate. The folding portion includes a first area, a second area farther away from the first non-folding area than the first area is, and a third area closer to the second non-folding area than the second area is. Each of the first area and the third area includes a first stress control pattern including first grooves defined in an upper surface of the insulation plate, and the second area includes a second stress control pattern including at least one of second grooves or openings defined in a lower surface of the insulation plate.

According to some embodiments, the folding portion further includes fourth and fifth areas respectively between the first area and the second area and between the second area and the third area.

According to some embodiments, the lower surface of the insulation plate defines one plane in the first non-folding area, the first area, and the fourth area and defines one plane in the second non-folding area, the third area, and the fifth area.

According to some embodiments, the first grooves of each of the first and third areas are arranged in a lattice shape in a plan view, and the second grooves or the openings of the second area are arranged in a lattice shape in the plan view.

According to some embodiments, the insulation plate includes at least one of plastic, fiberglass reinforced plastic, or glass.

According to some embodiments, the digitizer includes a first digitizer overlapping the first non-folding area and a second digitizer overlapping the second non-folding area and independently driven from the first digitizer.

According to some embodiments, the display device further includes a first metal plate on a lower surface of the first digitizer and a second metal plate on a lower surface of the second digitizer and spaced apart from the first metal plate.

Aspects of some embodiments of the inventive concept include a display device including a display panel, an insulation plate, and a digitizer. The display panel includes a first non-folding area, a second non-folding area, and a folding area between the first non-folding area and the second non-folding area, is unfolded in a first mode, and is folded in a second mode. The insulation plate is under the display panel and includes an upper surface and a lower surface corresponding to the upper surface. The digitizer is under the insulation plate. The insulation plate includes a folding portion corresponding to the folding area. In a state where the insulation plate is folded to correspond to the second mode of the display panel, the folding portion includes a first curvature area having a first curvature with respect to a first axis defined outside the folding portion, a second curvature area further away from the first non-folding area than the first curvature area is and having a second curvature greater than the first curvature with respect to a second axis defined inside the folding portion, a third curvature area closer to the second non-folding area than the second curvature area is and having a third curvature with respect to a third axis defined outside the folding portion, a first non-curvature area between the first curvature area and the second curvature area, and a second non-curvature area between the second curvature area and the third curvature area. Each of the first curvature area and the third curvature area includes a first stress control pattern including first grooves defined in the upper surface of the insulation plate, and the second curvature area includes a second stress control pattern including at least one of second grooves or openings defined in the lower surface of the insulation plate.

According to some embodiments, the lower surface of the insulation plate extends consecutively in the first non-folding area, the first curvature area, and the first non-curvature area, and the lower surface of the insulation plate extends consecutively in the second non-folding area, the third curvature area, and the second non-curvature area.

According to some embodiments, the third curvature is substantially the same as the first curvature and is smaller than the second curvature.

According to some embodiments, when the insulation plate is folded, a radius of curvature of the second curvature area is greater than a distance between the first non-folding area and the second non-folding area.

Aspects of some embodiments of the inventive concept include a display device including a display panel, an insulation plate, and a digitizer. The display panel includes a first non-folding area, a second non-folding area, and a folding area between the first non-folding area and the second non-folding area, is unfolded in a first mode, and is folded in a second mode. The insulation plate includes a first plate and a second plate under the first plate and is under the display panel. The digitizer is under the insulation plate. Each of the first plate and the second plate includes a folding portion corresponding to the folding area. The folding portion of the first plate includes a first area in which first openings are defined, a second area further away from the first non-folding area than the first area is, and a third area closer to the second non-folding area than the second area is and provided with second openings defined therein. The folding portion of the second plate includes a fourth area corresponding to the first area, a fifth area corresponding to the second area and provided with third openings defined therein, and a sixth area corresponding to the third area.

According to some embodiments, an area of the fifth area in which the third openings are defined has a width equal to or smaller than a width of the second area.

According to some embodiments, when the insulation plate is folded to correspond to the second mode of the display panel, each of the first area and the fourth area has a first curvature, at least a portion of each of the second area and the fifth area has a second curvature, each of the third area and the sixth area has a third curvature, and the first curvature is greater than the second curvature and is substantially the same as the third curvature.

According to some embodiments, the insulation plate further includes an adhesive layer between the first plate and the second plate.

According to some embodiments, the adhesive layer overlaps at least a portion of each of the first non-folding area and the second non-folding area.

According to some embodiments, when the insulation plate is unfolded to correspond to the first mode of the display panel, the first plate and the second plate are spaced apart from each other along a thickness direction of the insulation plate in the folding area.

According to some embodiments, the first plate further includes fourth openings defined in the second area.

According to some embodiments, an area of the second area in which the fourth openings are defined has a width that is substantially the same as a width of an area of the fifth area in which the third openings are defined.

According to some embodiments, the first plate includes a material having a rigidity higher than a rigidity of the second plate.

According to some embodiments, the display device is able to be folded and includes the insulation plate and the digitizer. When the insulation plate is folded, areas each of which includes a curvature and a center of curvature, which are different from each other, are defined in the insulation plate. Because different stress control patterns are positioned to correspond to the areas of the insulation plate, the durability of the insulation plate may be maintained, and the flexibility of the insulation plate may be improved.

BRIEF DESCRIPTION OF THE DRAWINGS

The above and other characteristics of embodiments according to the present disclosure will become readily apparent by reference to the following detailed description when considered in conjunction with the accompanying drawings wherein.

DETAILED DESCRIPTION

Figure 1A:
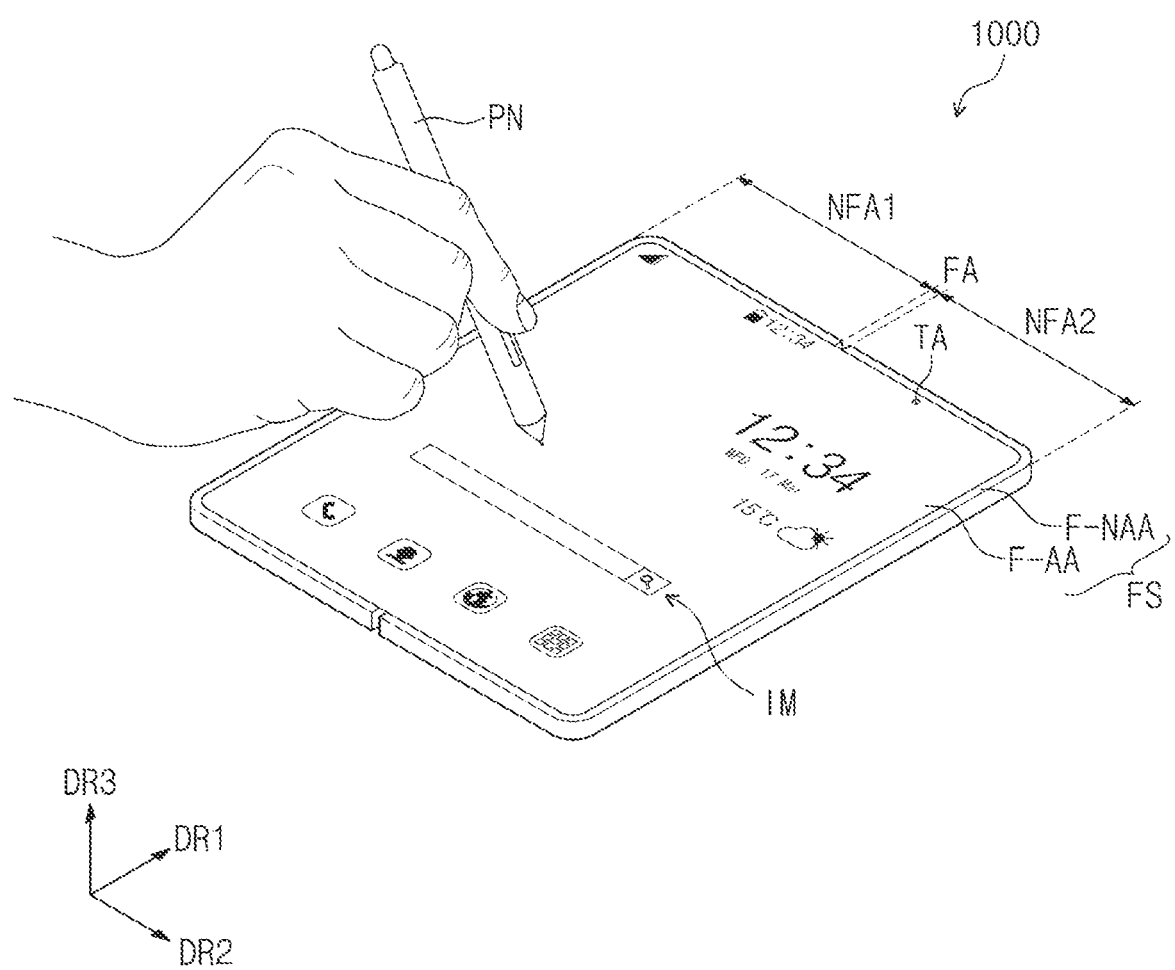
FIGS. 1A to 1D are perspective views showing a display device according to some embodiments of the present disclosure.

In the present disclosure, it will be understood that when an element or layer is referred to as being "on", "connected to" or "coupled to" another element or layer, it can be directly on, connected or coupled to the other element or layer or intervening elements or layers may be present.

Like numerals refer to like elements throughout. In the drawings, the thickness, ratio, and dimension of components are exaggerated for effective description of the technical content.

As used herein, the term "and/or" may include any and all combinations of one or more of the associated listed items.

It will be understood that, although the terms first, second, etc. may be used herein to describe various elements, these elements should not be limited by these terms. These terms are only used to distinguish one element from another element. Thus, a first element discussed below could be termed a second element without departing from the teachings of the present disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another element(s) or feature(s) as illustrated in the figures.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, aspects of some embodiments of the present disclosure will be explained in more detail with reference to the accompanying drawings.

Figure 1B:
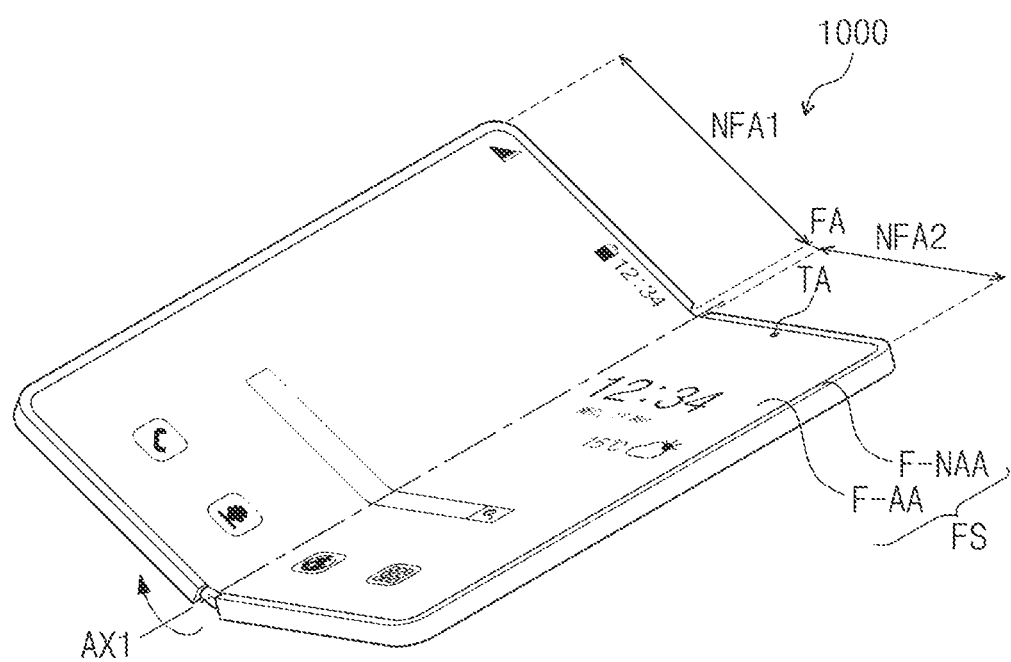
Figure 1C:
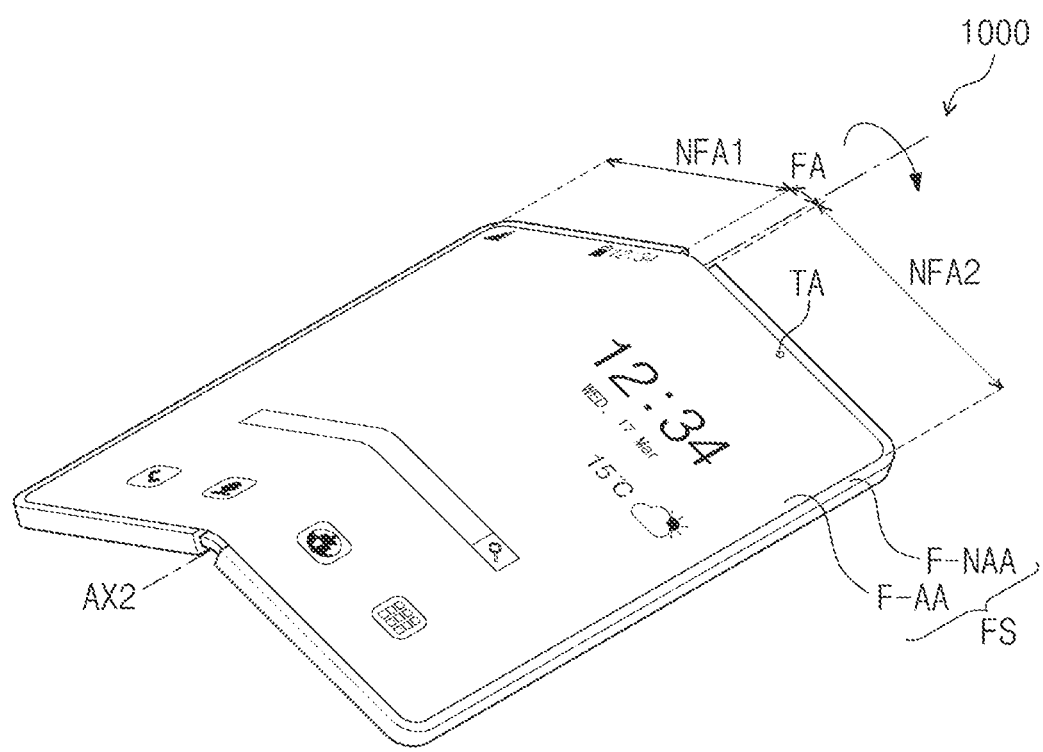
Figure 1C:
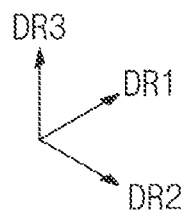
Figure 1D:
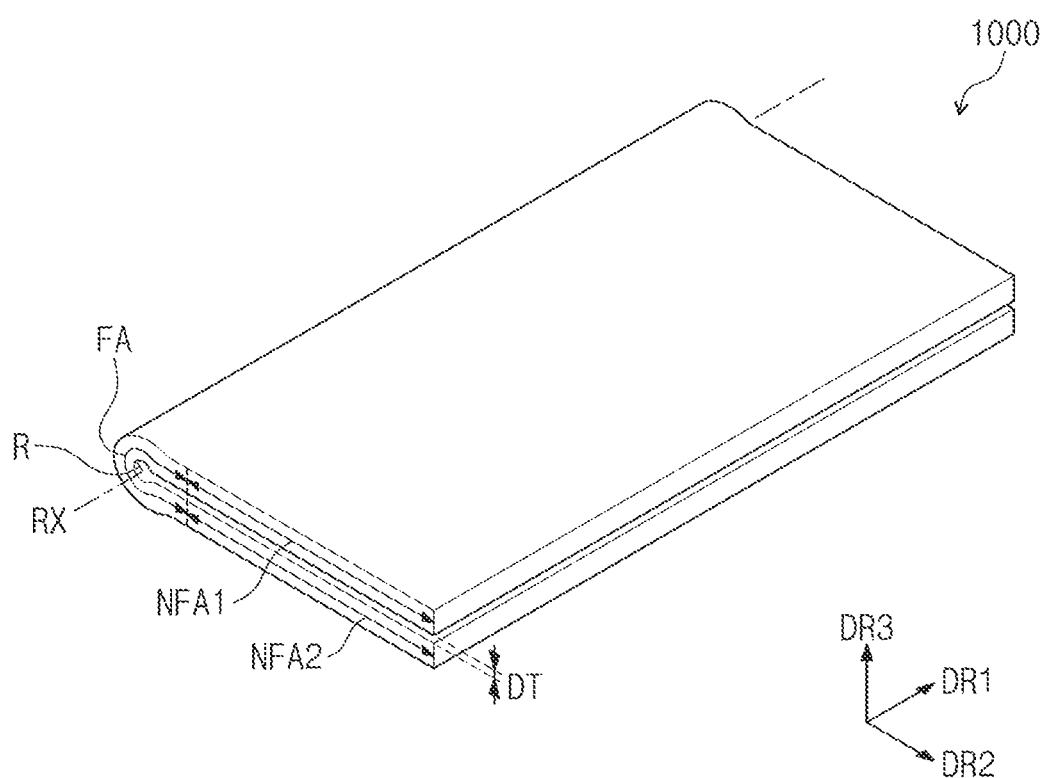

FIGS. 1A to 1D are perspective views showing a display device 1000 according to some embodiments of the present disclosure. FIG. 1A is a perspective view showing the display device 1000 in an unfolded state. FIGS. 1B and 1C are perspective views showing a process in which the display device 1000 is folded, and FIG. 1D is a perspective view showing the display device 1000 in a folded state.

The display device 1000 shown in FIGS. 1A to 1D may be a device that is activated in response to electrical signals. The display device 1000 may include various embodiments. For example, the display device 1000 may include a tablet computer, a notebook computer, a computer, or a smart television. In the present embodiments for the ease of illustration, a smartphone will be described as a representative example of the display device 1000, but embodiments according to the present disclosure are not limited thereto.

The display device 1000 may display an image IM at a display surface FS that is substantially parallel to each of a first direction DR1 and a second direction DR2 toward a third direction DR3. The display surface FS through which the image IM is displayed may correspond to a front surface of the display device 1000. The image IM may include a still or static image as well as video images. FIGS. 1A to 1C show an internet search bar and a clock widget as an example of the image IM.

In the present embodiments, upper (or front) and lower (or rear) surfaces of each member of the display device 1000 may be defined with respect to a direction in which the image IM is displayed when the display device 1000 is in the unfolded state. The upper and lower surfaces may be opposite to each other in the third direction DR3, and a normal line direction of each of the upper and lower surfaces may be substantially parallel to the third direction DR3.

The display device 1000 may sense an external input applied thereto from an outside. The external input may be a user input. The user input may include various forms of inputs, such as a part of user's body, an electromagnetic pen PN, light, heat, or pressure.

As an example, the external inputs may include a proximity input (e.g., hovering) applied when approaching close to or being adjacent to the display device 1000 at a distance (e.g., a set or predetermined distance) as well as a touch input by the part of user's body (e.g., a hand of user). In addition, the external inputs may be provided in the form of force, pressure, temperature, light, etc.

According to some embodiments, the display device 1000 may also sense an external input generated by the electromagnetic pen PN. In addition, the display device 1000 may sense a plurality of inputs of different forms. As an example, the display device 1000 may sense the external input generated by the electromagnetic pen PN and the external input generated by the user's hand.

FIG. 1A shows the display device 1000 in the unfolded state (a first mode). In FIG. 1A, the external input generated by the electromagnetic pen PN is shown as a representative example of the external input applied to the display device 1000. According to some embodiments, the electromagnetic pen PN may be attached to inside or outside the display device 1000 and may be detached therefrom. The display device 1000 may provide or receive signals corresponding to the attachment and detachment of the electromagnetic pen PN.

The display surface FS may include an active area F-AA and a peripheral area F-NAA. The peripheral area F-NAA may be defined adjacent to the active area F-AA. The peripheral area F-NAA may have a light transmittance lower than that of the active area F-AA and may have a color (e.g., a set or predetermined color).

According to some embodiments, the peripheral area F-NAA may surround the active area F-AA. Accordingly, the active area F-AA may have a shape substantially determined by the peripheral area F-NAA, however, this is merely one example. According to some embodiments, the peripheral area F-NAA may be defined adjacent to only one side of the active area F-AA or may be omitted.

The display surface FS may further include a signal transmission area TA. The signal transmission area TA is shown as a portion of the active area F-AA, however, according to some embodiments, the signal transmission area TA may be a portion of the peripheral area F-NAA.

The signal transmission area TA may have a transmittance higher than that of the active area F-AA and the peripheral area F-NAA. A natural light, a visible light, or an infrared light may travel through the signal transmission area TA. The display device 1000 may further include a sensor that takes a picture of an external object using the visible light traveling through the signal transmission area TA or that determines an approach of the external object using the infrared light.

According to some embodiments, the display device 1000 may be folded about a folding axis (e.g., a set or predetermined folding axis) (e.g., when operating in, or to cause the display device 100 to operate in, a second mode). As an example, referring to FIG. 1B, an imaginary first folding axis AX1 extending in the first direction DR1 may be defined in the display device 1000. The first folding axis AX1 may extend in the first direction DR1 on the display surface FS.

The display surface FS of the display device 1000 may include a folding area FA folded about the first folding axis AX1 and a first non-folding area NFA1 and a second non-folding area NFA2, which are spaced apart from each other with the folding area FA interposed therebetween in the second direction DR2.

The display device 1000 may be inwardly folded about the first folding axis AX1 in an in-folding method to allow the first non-folding area NFA1 to face the second non-folding area NFA2.

In addition, referring to FIG. 1C, the display device 1000 may be outwardly folded about a second folding axis AX2 in an out-folding method to allow the first non-folding area NFA1 and the second non-folding area NFA2 to face directions opposite to each other, respectively.

The display device 1000 may be operated in only one operation method selected from the in-folding method and the out-folding method with respect to one folding axis. According to some embodiments, the display device 1000 may be inwardly folded (in-folding) and outwardly folded (out-folding) with respect to one folding axis.

Referring to FIG. 1D, when the display device 1000 is inwardly folded (in-folding), at least a portion of the folding area FA may have a curvature (e.g., a set or predetermined curvature). The folding area FA may have a center of curvature RX inside the folding area FA and may have a radius (e.g., a set or predetermined radius) of curvature R. According to some embodiments, the radius of curvature R may be greater than a distance DT between the first non-folding area NFA1 and the second non-folding area NFA2.

Figure 2:
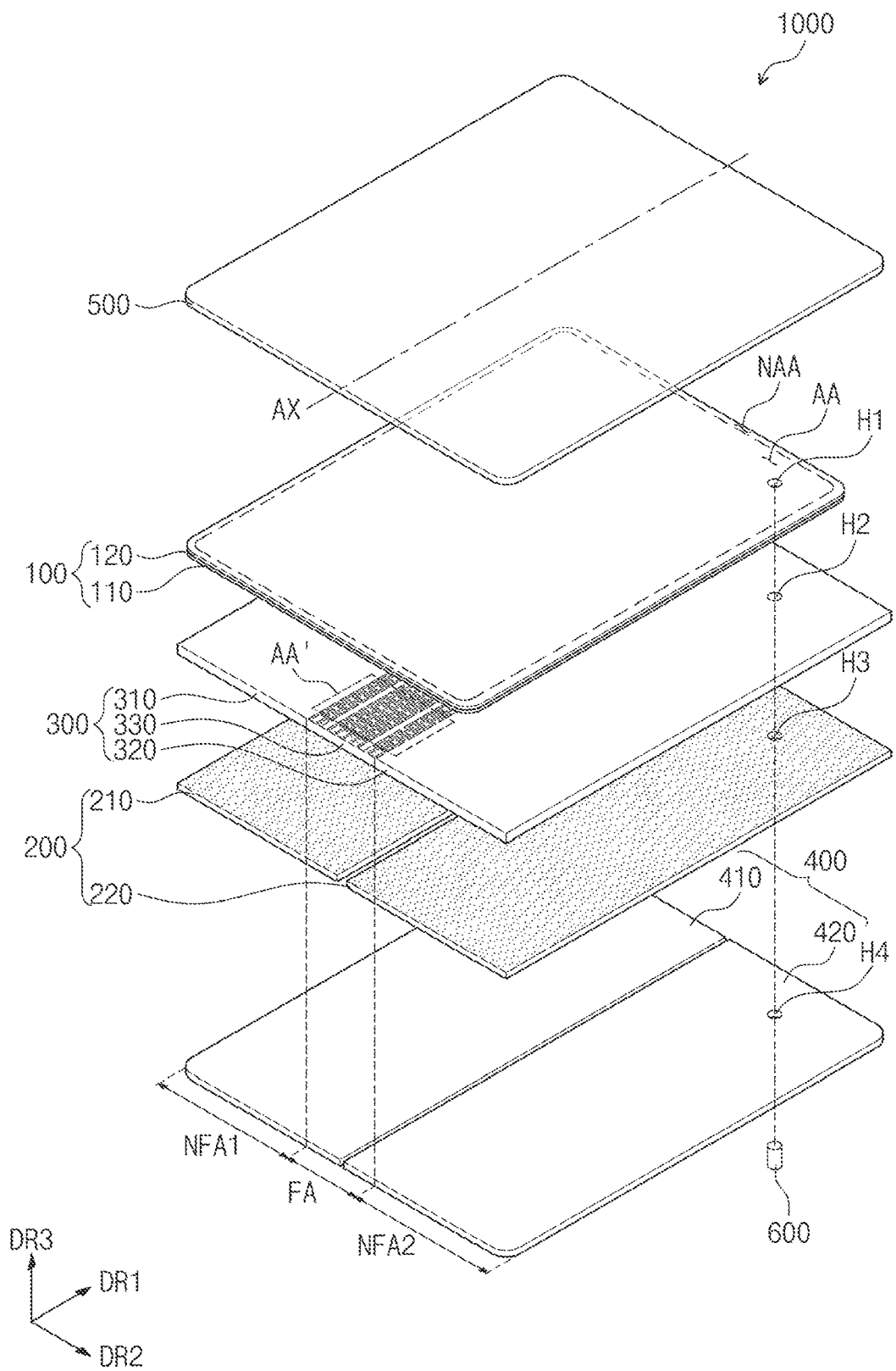
FIG. 2 is an exploded perspective view showing a display device according to some embodiments of the present disclosure.

FIG. 2 is an exploded perspective view showing a display device 1000 according to some embodiments of the present disclosure. Referring to FIG. 2, the display device 1000 may include an electronic panel 100, a digitizer 200, an insulation plate 300, a metal plate 400, and a window 500.

The electronic panel 100 may be a flexible panel. Accordingly, the electronic panel 100 may be entirely rolled or may be folded or unfolded about a folding axis AX.

The electronic panel 100 may include an active area AA and a peripheral area NAA, which respectively correspond to the active area F-AA and the peripheral area F-NAA of the display device 1000 shown in FIG. 1A. Hereinafter, the active area F-AA and the peripheral area N-FAA of the display device 1000 will be described the same as the active area AA and the peripheral area NAA of the electronic panel 100.

The electronic panel 100 may include a display panel 110 and an input sensor 120. The display panel 110 may generate images. The display panel 110 may be a light-emitting type display panel, however, it should not be particularly limited. For instance, the display panel 110 may be an organic light emitting display panel or an inorganic light emitting display panel. A light emitting layer of the organic light emitting display panel may include an organic light emitting material. A light emitting layer of the inorganic light emitting display panel may include a quantum dot or a quantum rod. Hereinafter, the organic light emitting display panel will be described as a representative example of the display panel 110.

The display panel 110 may include a plurality of light emitting portions. The light emitting portions may be located in the active area AA and may emit colors (e.g., set or predetermined colors), respectively. In a case where the light emitting layer is provided in plural, the light emitting portions may respectively correspond to the light emitting layers. In a case where the light emitting layer is provided in a single layer, the light emitting portions may respectively correspond to the color filters or color conversion members.

The input sensor 120 may be located on the display panel 110. The input sensor 120 may sense the external input. As an example, the input sensor 120 may include a capacitive touch panel. The input sensor 120 may sense a position and/or an intensity of a touch event applied by the user's hand over the entire active area AA, however, this is merely one example. According to some embodiments, the input sensor 120 may sense various types of inputs, and it should not be particularly limited.

The input sensor 120 may be arranged directly on the display panel 110. According to some embodiments, the input sensor 120 may be formed on the display panel 110 through successive processes. That is, the input sensor 120 may be directly formed on the display panel 110 without a coupling member such as a separate adhesive film.

However, embodiments according to the present disclosure should not be limited thereto or thereby, and the input sensor 120 may be coupled with the display panel 110 with the coupling member, such as the adhesive film, interposed therebetween. In this case, the input sensor 120 may be coupled with an upper surface of the display panel 110 by the adhesive film after being manufactured through a separate process from the display panel 110, however, this is merely one example. According to some embodiments, the input sensor 120 may be omitted.

The digitizer 200 may be located under the electronic panel 100. The digitizer 200 may sense an external input different from the external input sensed by the electronic panel 100. In detail, the digitizer 200 may sense the external input different from the external input sensed by the input sensor 120.

The digitizer 200 may sense a position or an intensity of a signal applied to the window 500 by the electromagnetic pen PN. The digitizer 200 may be driven by an electromagnetic resonance (EMR), however, this is merely one example. According to some embodiments, the digitizer 200 may be designed in various driving methods as long as the digitizer 200 may sense the input by the electromagnetic pen PN and should not be particularly limited.

The digitizer 200 may include a first digitizer 210 and a second digitizer 220. The first digitizer 210 and the second digitizer 220 may have substantially the same structure as each other and may be driven by the same way.

The first digitizer 210 may overlap a first non-folding area NFA1, and the second digitizer 220 may overlap a second non-folding area NFA2. The first digitizer 210 and the second digitizer 220 may be driven independently of each other. The first digitizer 210 and the second digitizer 220 may be separated from each other in a folding area FA. Loop coils 211 and 212 (refer to FIG. 3B) to be described later may not overlap the folding area FA.

However, this is merely one example, and according to some embodiments, the digitizer 200 may be provided as one sensor that overlaps the folding area FA, the first non-folding area NFA1, and the second non-folding area NFA2, however, embodiments according to the present disclosure are not limited thereto.

The insulation plate 300 may be located between the electronic panel 100 and the digitizer 200 to support the electronic panel 100. According to some embodiments, the insulation plate 300 may be selected from materials that transmit a magnetic field generated by the digitizer 200 without loss or with minimal loss. The insulation plate 300 may include a non-metallic material having insulating properties. As an example, the insulation plate 300 may include plastic, fiberglass reinforced plastic, or glass. The plastic may include polyimide (PI) or polyethylene terephthalate (PET), however, embodiments according to the present disclosure are not limited thereto.

As the insulation plate 300 has the insulating properties, the magnetic field may pass through the insulation plate 300. Accordingly, the digitizer 200 located under the insulation plate 300 may sense the input of the electromagnetic pen PN.

Different from the present disclosure, in a case where a plate including a metal material is used as a support plate instead of the insulation plate 300, the magnetic field is shielded by the metal material, and a sensitivity of the digitizer 200 is deteriorated. On the other hand, when the support plate includes the insulating material as does the insulation plate 300 of the present disclosure, the magnetic field may be prevented from being shielded.

The insulation plate 300 may include a first support portion 310, a second support portion 320, and a folding portion 330. The first support portion 310 and the second support portion 320 may be spaced apart from each other with the folding portion 330 interposed therebetween in the second direction DR2. The first support portion 310 and the second support portion 320 may overlap the first non-folding area NFA1 and the second non-folding area NFA2, respectively.

The folding portion 330 may overlap the folding area FA. According to some embodiments of the present disclosure, the folding portion 330 may include a plurality of stress control patterns formed by partially removing the insulation plate 300. The flexibility of the folding portion 330 may be improved by the stress control patterns.

The metal plate 400 may be located under the digitizer 200 to support the digitizer 200. The metal plate 400 may include a first metal plate 410 and a second metal plate 420, which are spaced apart from each other in the second direction DR2.

The first metal plate 410 may overlap the first non-folding area NFA1 in a plan view (e.g., a view perpendicular or normal with respect to the upper surface or a view parallel to the direction DR3). The second metal plate 420 may overlap the second non-folding area NFA2 in a plan view.

The metal plate 400 may have a modulus higher than that of the insulation plate 300. For example, the metal plate 400 may include materials having the modulus higher than that of the insulation plate 300. As an example, each of the first and second metal plates 410 and 420 may include a metal, such as a copper alloy, a steel use stainless (SUS). Accordingly, the metal plate 400 may stably protect the electronic panel 100 from external impacts.

The window 500 may be located on the electronic panel 100. The window 500 may provide an area that overlaps the active area AA of the electronic panel 100 and is optically transparent. The window 500 may provide the display surface FS (refer to FIG. 1A) of the display device 1000. The external input generated by the electromagnetic pen PN (refer to FIG. 1A) may be substantially applied to the window 500. The image IM (refer to FIG. 1A) displayed through the electronic panel 100 may be viewed by the user through the window 500.

The window 500 may include a thin film glass or a synthetic resin film. When the window 500 includes the thin film glass, the window 500 may have a thickness equal to or smaller than about 100 μm. As an example, the thickness of the window may be about 30 μm, however, embodiments according to the present disclosure are not limited thereto or thereby.

When the window 500 includes the synthetic resin film, the window 500 may include a polyimide (PI) film or a polyethylene terephthalate (PET) film.

The window 500 may have a single-layer or multi-layer structure. For example, the window 500 may include a plurality of synthetic resin films coupled to each other by an adhesive or the glass substrate and the synthetic resin film coupled to the glass substrate by the adhesive.

The window 500 may include a flexible material. Thus, the window 500 may be folded or unfolded about a folding axis AX. That is, when the shape of the electronic panel 100 is changed, the shape of the window 500 may be changed to correspond to the shape of the electronic panel 100.

The window 500 may transmit the image from the electronic panel 100 and substantially simultaneously may buffer the external impacts to prevent the electronic panel 100 from being damaged or malfunctioning due to the external impacts. The external impacts indicate external force represented by pressure or stress, which cause defects in the electronic panel 100.

According to some embodiments, the display device 1000 may further include a protective layer located on the window 500. The protective layer may improve an impact resistance of the window 500 and may prevent the window 500 from shattering when damaged.

The protective layer may include at least one of a urethane-based resin, an epoxy-based resin, a polyester-based resin, a polyether-based resin, an acrylate-based resin, an acrylonitrile-butadiene-styrene (ABS) resin, or a rubber.

As an example, the protective layer may include at least one of phenylene, polyethylene terephthalate (PET), polyimide (PI), polyamide (PA), polyethylene naphthalate (PEN), or polycarbonate (PC).

According to some embodiments, the display device 1000 may further include one or more functional layers located between the electronic panel 100 and the window 500. As an example, the functional layer may be an anti-reflective layer that blocks the reflection of external light. The anti-reflective layer may prevent components included in the electronic panel 100 from being viewed from the outside due to the external light incident through the front surface of the display device 1000. The anti-reflective layer may include a retarder, a polarizer, or a color filter.

An electronic module 600 may be located under the metal plate 400. The electronic module 600 may include at least one of a camera, a speaker, a light sensor, or a heat sensor. The electronic module 600 may include a plurality of components, and it should not be particularly limited.

The electronic module 600 may be arranged to overlap the active area AA. Through holes H1, H2, H3, and H4 may be defined through the electronic panel 100, the digitizer 200, the insulation plate 300, and the metal plate 400, respectively.

The electronic module 600 may sense an external object outside the display device 1000 through the through holes H1, H2, H3, and H4 or may provide a sound signal such as a voice to the outside, however, this is merely one example. According to some embodiments, any one of the through holes H1, H2, H3, and H4 may be omitted.

In addition, the electronic module 600 may be arranged to not overlap the active area AA. In this case, the through holes H1, H2, H3, and H4 may be omitted.

Figure 3A:
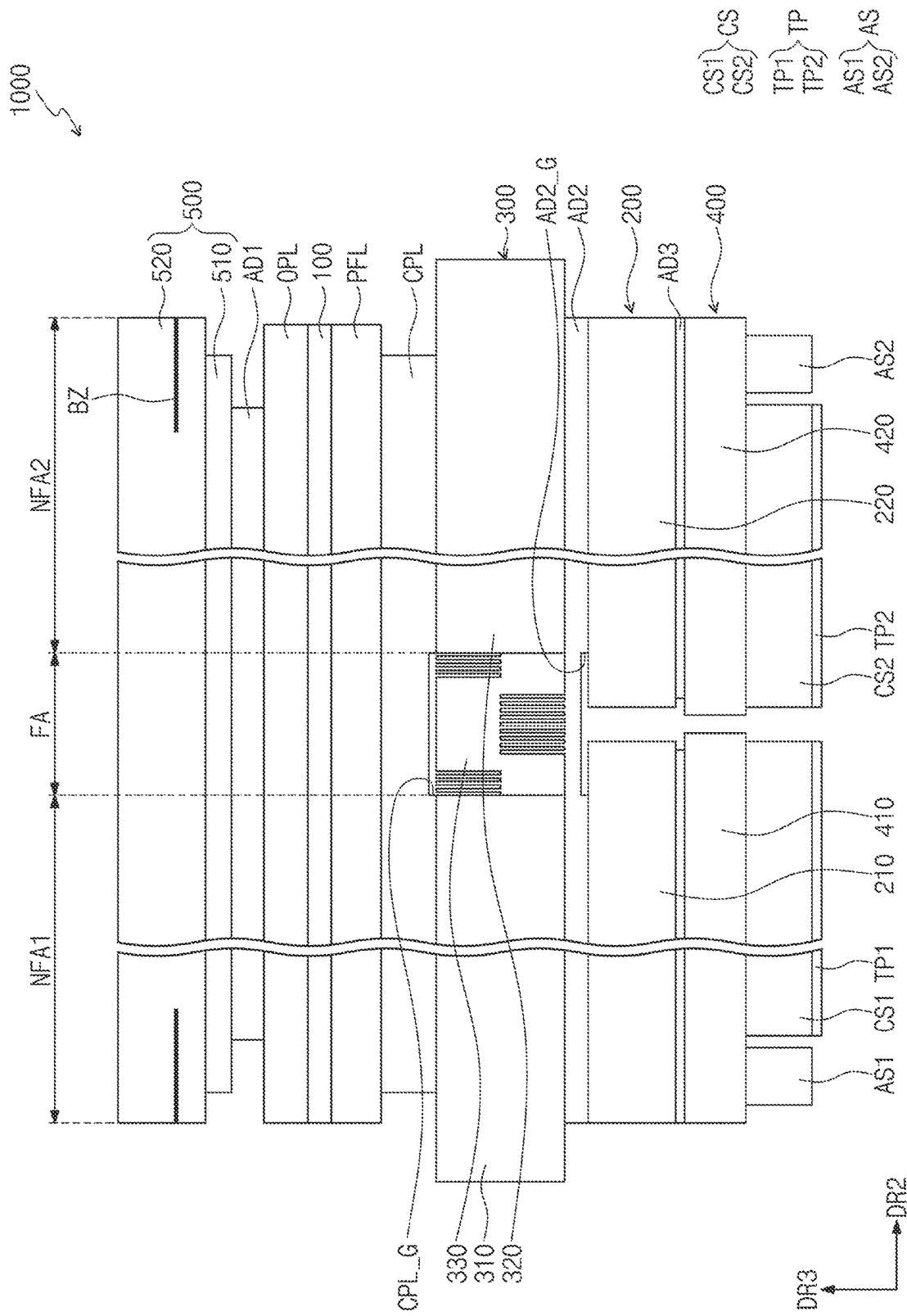
FIG. 3A is a cross-sectional view showing a display device according to some embodiments of the present disclosure.
Figure 3B:
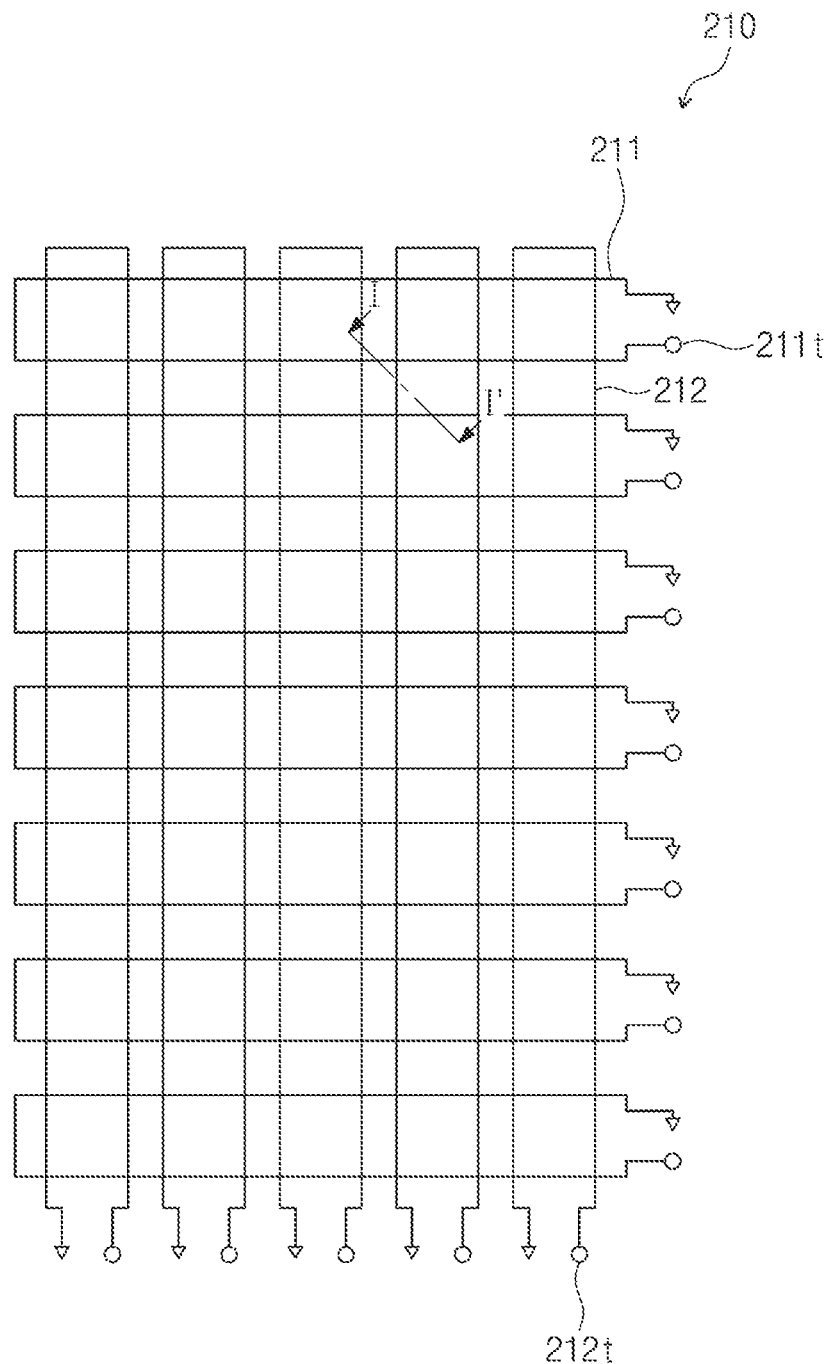
FIG. 3B is a plan view showing some parts of a display device according to some embodiments of the present disclosure.
Figure 3C:
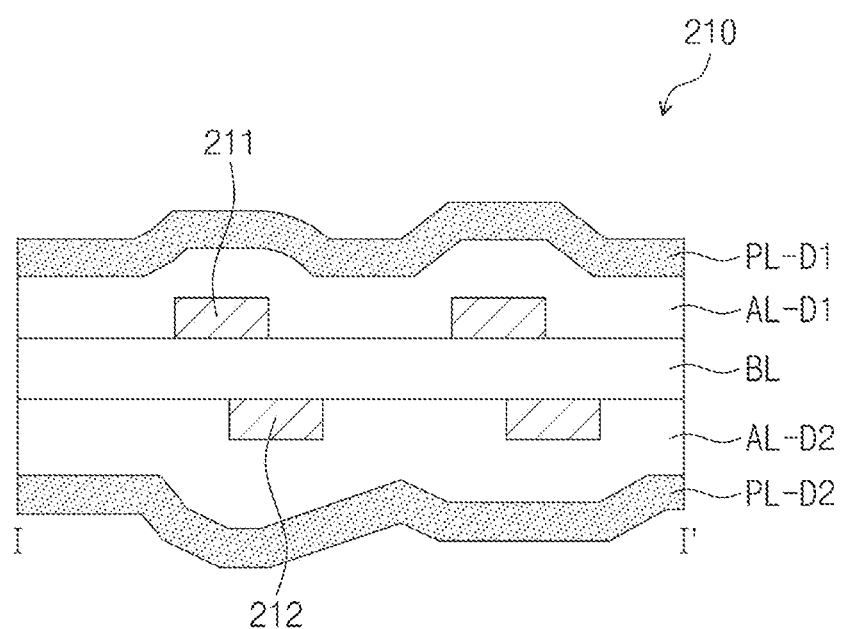
FIG. 3C is a cross-sectional view taken along a line I-I' shown in FIG. 3B.

FIG. 3A is a cross-sectional view showing the display device 1000 according to some embodiments of the present disclosure. FIG. 3B is a plan view showing some parts of the display device 1000 according to some embodiments of the present disclosure. FIG. 3C is a cross-sectional view taken along a line I-I' shown in FIG. 3B. FIG. 3B is a plan view showing the first digitizer 210, and FIG. 3C is a cross-sectional view showing a portion of the first digitizer 210.

Hereinafter, a stack structure of the display device 1000 in a cross-section and components of the display device 1000 will be described in more detail with reference to FIG. 3A. The display device 1000 may further include a variety of functional layers in addition to the electronic panel 100, the digitizer 200, the insulation plate 300, the metal plate 400, and the window 500, which are described with reference to FIG. 2. In FIG. 3A, the same reference numerals denote the same elements in FIG. 2, and thus, detailed descriptions of the same elements will be omitted.

The window 500 may include a first layer 510, a second layer 520, and a bezel pattern BZ. The first layer 510 may include a glass material. As an example, the first layer 510 may have a thickness of about 10 µm. Accordingly, the first layer 510 may be easily folded.

The second layer 520 may be located on the first layer 510. The second layer 520 may include a material having a modulus lower than that of the first layer 510. As an example, the second layer 520 may be a film including an organic material. The second layer 520 may have a thickness greater than that of the first layer 510. Accordingly, the second layer 520 may protect an upper surface of the first layer 510.

Meanwhile, the bezel pattern BZ may be inserted into the second layer 520, however, this is merely one example. According to some embodiments, the bezel pattern BZ may be located on a lower surface or an upper surface of the second layer 520. The bezel pattern BZ may be a colored pattern having a color or reflective pattern (e.g., a set or predetermined color or a reflective pattern).

The bezel pattern BZ may define the peripheral area NAA described with reference to FIG. 2, however, this is merely one example. According to some embodiments, the bezel pattern BZ may be omitted. In addition, according to some embodiments, the window 500 may be formed as a single layer or may further include other functional layers, and it should not be particularly limited.

An optical layer OPL and a first adhesive layer AD1 may be located between the window 500 and the electronic panel 100. The optical layer OPL may be located on the electronic panel 100. The optical layer OPL may reduce a reflectance of the external light. The optical layer OPL may include a stretch-type synthetic resin film. As an example, the optical layer OPL may be formed by adsorbing iodine compound on a polyvinyl alcohol (PVA) film. According to some embodiments, the optical layer OPL may include a color filter. The optical layer OPL may include a variety of layers as long as the optical layer OPL may reduce the reflectance of the external light, and it should not be particularly limited.

The optical layer OPL and the window 500 may be coupled to each other by the first adhesive layer AD1. The first adhesive layer AD1 may include an optical clear adhesive (OCA), an optical clear resin (OCR), or a pressure sensitive adhesive (PSA). Adhesive layers described hereinafter may include the same material as the first adhesive layer AD1 and a conventional adhesive.

A panel protective film PFL and a lower protective film CPL may be located between the electronic panel 100 and the insulation plate 300. The panel protective film PFL may be located under the electronic panel 100. The panel protective film PFL may protect a lower portion of the electronic panel 100. The panel protective film PFL may include a flexible plastic material. For example, the panel protective film PFL may include polyethylene terephthalate.

The lower protective film CPL may be located under the panel protective film PFL. The lower protective film CPL may have a color (e.g., a set or predetermined color). The lower protective film CPL may protect a rear surface of the electronic panel 100 and may prevent or reduce the visibility of the rear surface of the electronic panel 100 due to the light. The lower protective film CPL may include a material having high light absorption.

Meanwhile, the lower protective film CPL may be provided with a recessed portion (e.g., a set or predetermined recessed portion) CPL_G formed therein to overlap the folding area FA. Due to the recessed portion CPL_G, a thickness of the lower protective film CPL in the folding area FA may be reduced, and thus, a folding stress may be reduced. In addition, as an adhesive layer is added to the recessed portion CPL_G, a coupling force between the lower protective film CPL and the insulation plate 300 may be improved.

The insulation plate 300 and the digitizer 200 may be coupled to each other by a second adhesive layer AD2. The second adhesive layer AD2 may be provided with a recessed portion (e.g., a set or predetermined recessed portion) AD2_G formed therein to overlap the folding area FA. The folding stress in the folding area FA may be reduced by the recessed portion AD2_G, however, this is merely one example. According to some embodiments, the recessed portion AD2_G may be omitted from the second adhesive layer AD2, or a portion of the second adhesive layer AD2, which overlaps the folding area FA, may be removed, and embodiments according to the present disclosure are not limited thereto or thereby.

The metal plate 400 and the digitizer 200 may be coupled to each other by a third adhesive layer AD3. The third adhesive layer AD3 may attach the first metal plate 410 and the second metal plate 420 to the first digitizer 210 and the second digitizer 220, respectively.

The display device 1000 may further include a cushion layer CS, an insulating layer TP, and a step difference compensation member AS, which are located under the metal plate 400. The cushion layer CS may absorb the external impacts to protect the electronic panel 100. The cushion layer CS may include a foam sheet with a certain elasticity. As an example, the cushion layer CS may include sponge or polyurethane. The cushion layer CS may include a first cushion layer CS1 and a second cushion layer CS2, and the first cushion layer CS1 and the second cushion layer CS2 may be respectively coupled to the first metal plate 410 and the second metal plate 420.

The insulating layer TP may be located under the cushion layer CS. The insulating layer TP may prevent a static electricity from inflowing. The insulating layer TP may be an insulating film. The insulating layer TP may include a first insulating layer TP1 and a second insulating layer TP2, the first insulating layer TP1 may be coupled to the first metal plate 410 by the first cushion layer CS1, and the second insulating layer TP2 may be coupled to the second metal plate 420 by the second cushion layer CS2.

The step difference compensation member AS may be coupled to a lower portion of the metal plate 400. The step difference compensation member AS may be a double-sided tape or an insulating film. The step difference compensation member AS may include a first step difference compensation member AS1 and a second step difference compensation member AS2, and the first step difference compensation member AS1 and the second step difference compensation member AS2 may be coupled to the first metal plate 410 and the second metal plate 420, respectively.

FIG. 3B is a plan view showing the first digitizer 210. According to some embodiments, the second digitizer 220 may have substantially the same configurations as those of the first digitizer 210. Hereinafter, the first digitizer 210 will be mainly described.

The first digitizer 210 may include a plurality of first loop coils 211 (hereinafter, referred to as first coils) and a plurality of second loop coils 212 (hereinafter, referred to as second coils). The first coils 211 and the second coils 212 may be referred to as driving coils and sensing coils, respectively, or vice versa.

The first coils 211 may be arranged in the first direction DR1 and may extend in the second direction DR2. The second coils 212 may extend in the first direction DR1, and the second coils 212 may be arranged in the second direction DR2 to be spaced part from each other.

Different from FIG. 3B, the first coils 211 may be arranged such that coils adjacent to each other may overlap each other. A bridge pattern may be located in intersection areas of the first coils 211. The second coils 212 may be arranged such that coils adjacent to each other may overlap each other. A bridge pattern may be located in intersection areas of the second coils 212.

An alternating current signal may be sequentially applied to first terminals 211t of the first coils 211. The other terminals of the first coils 211 may be grounded. The first terminals 211t of the first coils 211 may be respectively connected to signal lines.

When a current flows through the first coils 211, a magnetic field line may be induced between the first coils 211 and the second coils 212. The second coils 212 may sense an induced electromagnetic force emitted from the electromagnetic pen PN (refer to FIG. 1A) and may output the induced electromagnetic force to second terminals 212t of the second coils 212 as a sensing signal. The other terminals of the second coils 212 may be grounded. The second terminals 212t of the second coils 212 may be respectively connected to signal lines.

As shown in FIG. 3C, the first digitizer 210 may include a base layer BL, the first coils 211 located on one surface of the base layer BL, and the second coils 212 located on the other surface of the base layer BL.

The base layer BL may include a plastic film. For example, the base layer BL may include a polyimide (PI) film. The first coils 211 and the second coils 212 may include a metal material. As an example, the first coils 211 and the second coils 212 may include gold (Au), silver (Ag), copper (Cu), or aluminum (Al).

Protective layers PL-D1 and PL-D2 may be respectively located above the one surface and the other surface of the base layer BL to protect the first coils 211 and the second coils 212. The protective layers PL-D1 and PL-D2 may include a first protective layer PL-D1 and a second protective layer PL-D2.

The first protective layer PL-D1 may be located above the first coils 211 and may be attached to the first coils 211 by a first coil adhesive layer AL-D1. The second protective layer PL-D2 may be located above the second coils 212 and may be attached to the second coils 212 by a second coil adhesive layer AL-D2.

Each of the first protective layer PL-D1 and the second protective layer PL-D2 may include a plastic material. As an example, each of the first protective layer PL-D1 and the second protective layer PL-D2 may include a polyimide (PI) film.

As shown in FIG. 3C, concave and convex portions may be formed on upper and lower surfaces of the first digitizer 210. When the display device 1000 (refer to FIG. 3A) is viewed from an upper side of the window 500 (refer to FIG. 3A), the concave and convex portions may cause defects that the first coils 211 and the second coils 212 are viewed to the user.

However, according to some embodiments, the first support portion 310 and the second support portion 320 may prevent or reduce instances of the concave and convex portions caused by the first coils 211 and the second coils 212 being transferred upwardly. Accordingly, the insulation plate 300 may prevent the first coils 211 and the second coils 212 located thereunder from being viewed at an upper side of the display device 1000.

Figure 4A:
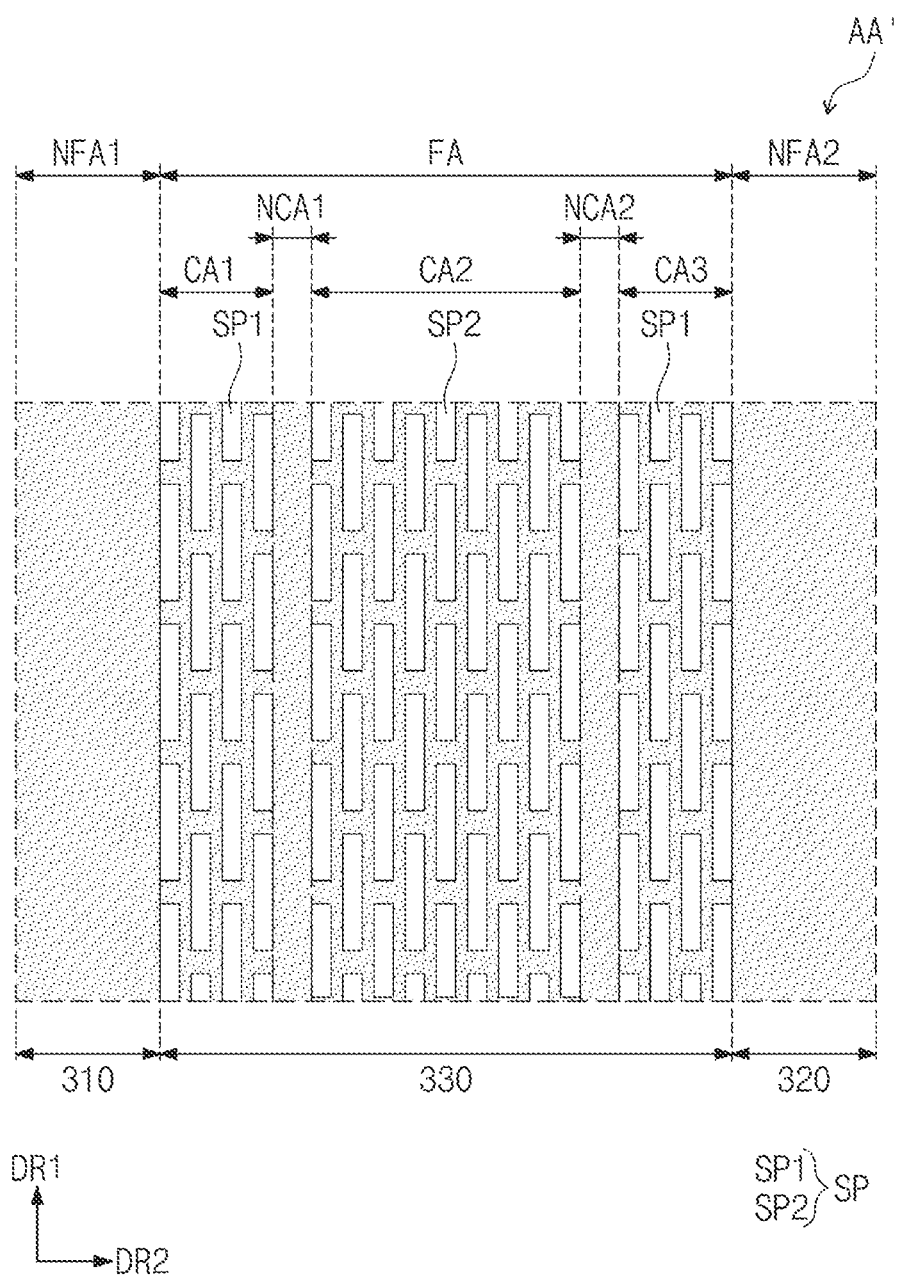
FIG. 4A is a plan view showing an area AA' of FIG. 2 according to some embodiments of the present disclosure.
Figure 4B:
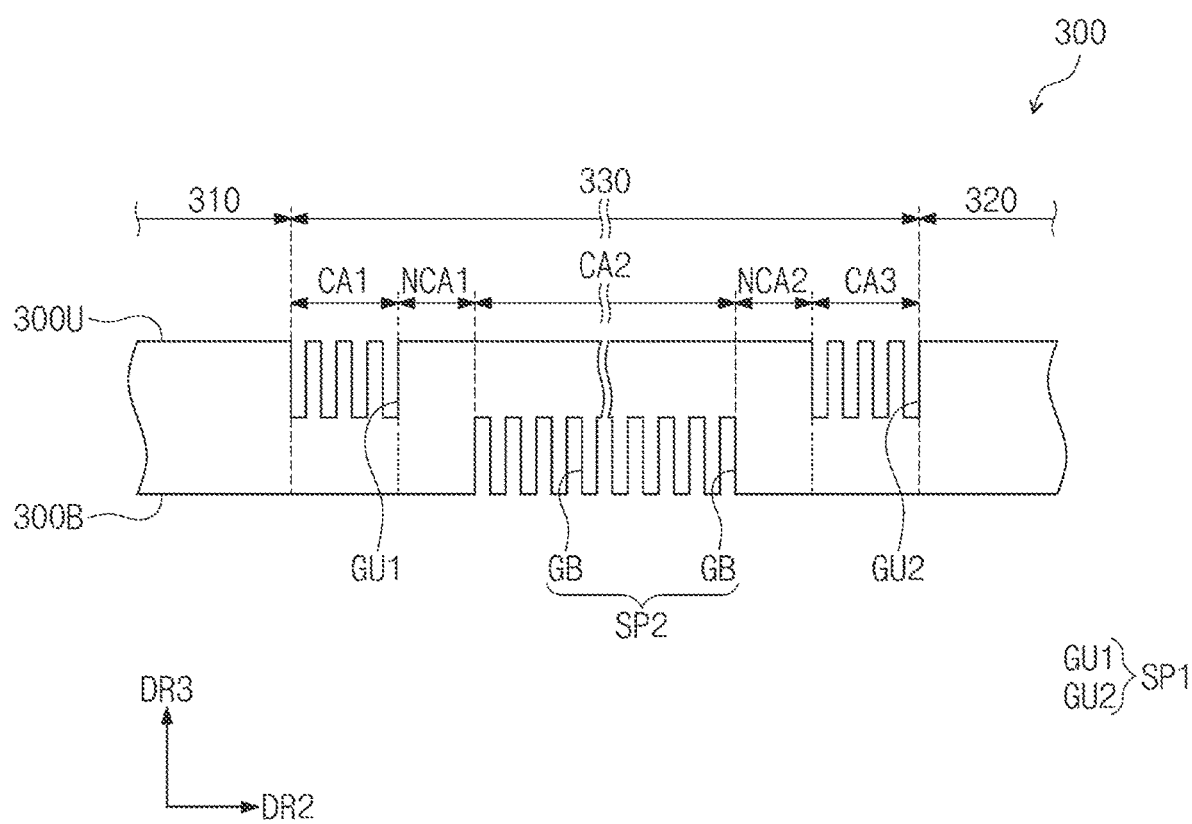
FIG. 4B is a cross-sectional view showing an insulation plate according to some embodiments of the present disclosure.
Figure 4C:
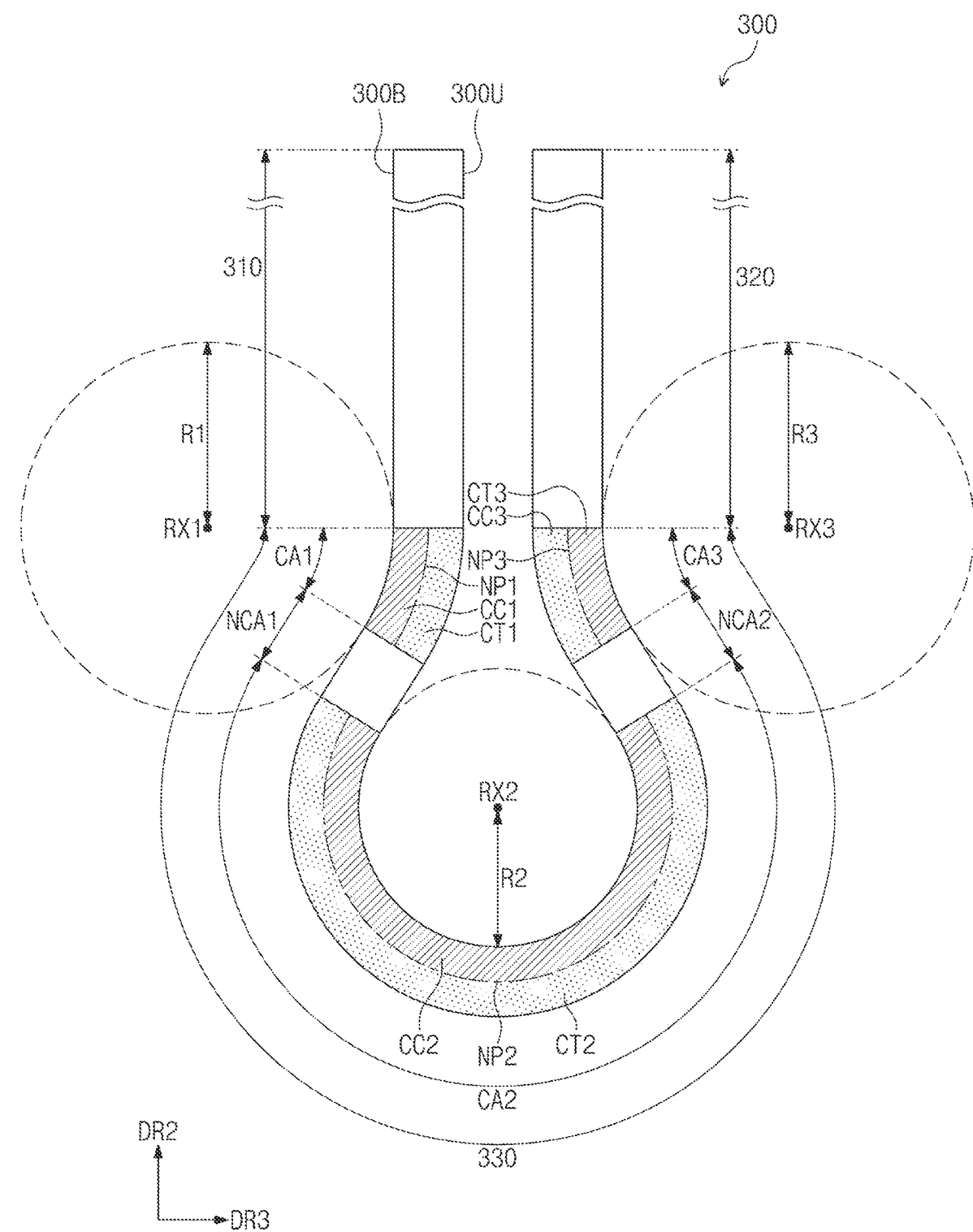
FIG. 4C is a cross-sectional view showing an insulation plate in a folded state according to some embodiments of the present disclosure.

FIG. 4A is a plan view showing an area AA' of FIG. 2 according to some embodiments of the present disclosure. FIG. 4B is a cross-sectional view showing the insulation plate 300 according to some embodiments of the present disclosure. FIG. 4C is a cross-sectional view showing the insulation plate 300 in a folded state according to some embodiments of the present disclosure.

Referring to FIG. 4A, the insulation plate 300 may include the first support portion 310, the second support portion 320, and the folding portion 330. According to some embodiments of the present embodiments described with respect to FIG. 4A, the first support portion 310 may correspond to the first non-folding area NFA1 described with reference to FIGS. 1A to 1D. The second support portion 320 may correspond to the second non-folding area NFA2 described with reference to FIGS. 1A to 1D. The folding portion 330 may correspond to the folding area FA described with reference to FIGS. 1A to 1D. For the convenience of explanation, FIG. 4A shows the folding area FA, the first non-folding area NFA1, and the second non-folding area NFA2 of the display device 1000 with the insulation plate 300.

The folding portion 330 may be defined as a portion whose shape is changed when a mode of the display device 1000 is switched to the second mode from the first mode. The shape of the first support portion 310 and the second support portion 320 may not be changed even though the mode of the display device 1000 is switched to the second mode from the first mode.

According to some embodiments of the present disclosure, the folding portion 330 may include a first area CA1, a second area CA2, a third area CA3, a fourth area NCA1, and a fifth area NCA2. Each of the first area CA1, the second area CA2, and the third area CA3 may be provided with patterns (e.g., set or predetermined patterns) defined therein. For example, the patterns SP may include grooves or openings. Portions obtained by removing a portion of the insulation plate 300 from an upper surface or a lower surface of the insulation plate 300 or portions obtained by removing a portion of the insulation plate 300 from the upper surface to the lower surface may be defined as the patterns SP. The patterns SP may not be defined in the fourth area NCA1 and the fifth area NCA2.

The second area CA2 may be located between the first area CA1 and the third area CA3. Accordingly, the second area CA2 may be positioned farther away from the first non-folding area NFA1 than the first area CA1 is. In addition, the second area CA2 may be positioned farther away from the second non-folding area NFA2 than the third area CA3 is.

The fourth area NCA1 may be located between the first area CA1 and the second area CA2. The fifth area NCA2 may be located between the second area CA2 and the third area CA3.

According to some embodiments, the patterns SP are not defined in the first support portion 310 and the second support portion 320, however, they should not be limited thereto or thereby. Although the first support portion 310 and the second support portion 320 have a flat shape in the second mode of the display device 1000, the patterns SP may be formed in some areas of the first support portion 310 and the second support portion 320. The areas of the first support portion 310 and the second support portion 320 in which the patterns SP are formed may be consecutively arranged next to the first area CA1 and the third area CA3, respectively.

The pattern formed in the first area CA1 and the third area CA3 may be defined as a first stress control pattern SP1. The pattern formed in the second area CA2 may be defined as a second stress control pattern SP2.

The first stress control pattern SP1 may include the grooves, and the second stress control pattern SP2 may include at least one of the grooves or the openings. This will be described in more detail later.

According to some embodiments, the patterns SP may be arranged in a lattice shape in the first, second, and third areas CA1, CA2, and CA3. As the size and the shape of the patterns SP are changed during the folding operation, the shape of the folding portion 330 may be easily changed. Accordingly, the flexibility of the folding portion 330 may be improved by the patterns SP1 and SP2.

In FIG. 4A, the patterns SP are shown as having a rectangular shape in a plan view as a representative example, however, they should not be limited thereto or thereby. According to some embodiments, the patterns SP may have a circular shape, an oval shape, or a polygonal shape.

Referring to FIG. 4B, the insulation plate 300 may include an upper surface 300U and a lower surface 300B opposite to the upper surface 300U. FIG. 4B shows grooves GU1, GU2, and GB as a representative example of the first stress control pattern SP1 and the second stress control pattern SP2.

According to some embodiments, the first stress control pattern SP1 may include upper grooves GU1 and GU2 defined in the upper surface 300U. Among the upper grooves GU1 and GU2, the upper grooves included in the first area CA1 may be defined as first upper grooves GU1, and among the upper grooves GU1 and GU2, the upper grooves included in the second area CA2 may be defined as second upper grooves GU2. The upper grooves GU1 and GU2 may be defined by removing portions of the insulation plate 300 from the upper surface 300U of the insulation plate 300.

As an example, the upper grooves GU1 and GU2 may be defined by removing the portions of the insulation plate 300 from the upper surface 300U of the insulation plate 300 to an intermediate point between the upper surface 300U and the lower surface 300B. However, according to some embodiments, the first upper grooves GU1 and the second upper grooves GU2 have depths smaller than a distance from the upper surface 300U to a first neutral plane NP1 (refer to FIG. 4C) and a distance from the upper surface 300U to a third neutral plane NP3 (refer to FIG. 4C), respectively.

According to some embodiments, the second stress control pattern SP2 may include lower grooves GB defined in the lower surface 300B. The lower grooves GB may be defined by removing portions of the insulation plate 300 from the lower surface 300B of the insulation plate 300.

As an example, the lower grooves GB may be defined by removing the portions of the insulation plate 300 from the lower surface 300B of the insulation plate 300 to an intermediate point between the upper surface 300U and the lower surface 300B. However, according to some embodiments, the lower grooves GB have a depth smaller than a distance from the lower surface 300B to a second neutral plane NP2 (refer to FIG. 4C).

According to some embodiments, the lower surface 300B of the insulation plate 300 may consecutively extend from the first support portion 310 to the first area CA1 and the fourth area NCA1 of the folding portion 330. That is, the second stress control pattern SP2 may not be formed in the lower surface 300B of the insulation plate 300 in the first support portion 310, the first area CA1, and the fourth area NCA1.

In addition, the lower surface 300B of the insulation plate 300 may consecutively extend from the second support portion 320 to the third area CA3 and the fifth area NCA2 of the folding portion 330. That is, the second stress control pattern SP2 may not be formed in the lower surface 300B of the insulation plate 300 in the second support portion 320, the third area CA3, and the fifth area NCA2.

In FIG. 4B, the upper grooves GU1 and GU2 are shown to have substantially the same depth as each other as a representative example. In addition, the lower grooves GB are shown to have substantially the same depth as each other, however, they should not be limited thereto or thereby. According to some embodiments, the upper grooves GU1 and GU2 may have different depths from each other, and the lower grooves GB may have different depths from each other.

Referring to FIG. 4C, as the mode of the display device 1000 is switched to the second mode from the first mode, the shape of the folding portion 330 may be changed from the shape shown in FIG. 4B to the shape shown in FIG. 4C. According to some embodiments, the insulation plate 300 may be folded in a dumbbell-like shape when viewed in a cross-section.

The first area CA1 may have a first curvature, the second area CA2 may have a second curvature, and the third area CA3 may have a third curvature. In this case, the fourth area NCA1 and the fifth area NCA2 may have the flat shape. Accordingly, the first area CA1 may be defined as a first curvature area, the second area CA2 may be defined as a second curvature area, and the third area CA3 may be defined as a third curvature area. In addition, the fourth area NCA1 and the fifth area NCA2 may be defined as a first non-curvature area and a second non-curvature area, respectively. Hereinafter, areas corresponding to each other will be assigned with the same reference numerals.

However, according to some embodiments, the entire area of the folding portion 330 of the insulation plate 300 may form a curved surface after the folding operation, and thus, the first non-curvature area NCA1 and the second non-curvature area NCA2 may be omitted. This will be described in more detail later.

According to some embodiments, the first curvature area CA1 may be bent about a first axis RX1 to have a first curvature and a first radius of curvature R1. The first axis RX1 may be defined outside the folding portion 330 to be adjacent to the first support portion 310.

As the first axis RX1 is defined outside the folding portion 330, the first curvature area CA1 may include a first compression area CC1 defined from the lower surface 300B to the first neutral plane NP1 and a first tension area CT1 defined as the other area. In the present disclosure, the compression area is an area in which the compressive stress is dominant over the tensile stress, and the tension area is an area in which the tensile stress is dominant over the compressive stress.

The second curvature area CA2 may have a second curvature and a second radius of curvature R2 with respect to a second axis RX2. The second axis RX2 may be defined inside the folding portion 330. According to some embodiments, the second curvature may be greater than the first curvature, and the second radius of curvature R2 may be smaller than the first radius of curvature R1.

As the second axis RX2 is defined inside the folding portion 330, the second curvature area CA2 may include a second compression area CC2 defined from the upper surface 300U to the second neutral plane NP2 and a second tension area CT2 defined as the other area.

The third curvature area CA3 may have a third curvature and a third radius of curvature R3 with respect to a third axis RX3 defined outside the folding portion 330. The third axis RX3 may be defined outside the folding portion 330 to be adjacent to the second support portion 320.

According to some embodiments, the third curvature and the third radius of curvature R3 may be substantially the same as the first curvature and the first radius of curvature R1, respectively. In addition, the third curvature may be smaller than the second curvature, and the third radius of curvature R3 may be greater than the second radius of curvature R2.

As the third axis RX3 is defined outside the folding portion 330, the third curvature area CA3 may include a third compression area CC3 defined from the lower surface 300B to the third neutral plane NP3 and a third tension area CT3 defined as the other area.

Referring to FIGS. 4B and 4C, the grooves GU1, GU2, and GB may be located in an area where the tensile stress is relatively dominant. The grooves GU1, GU2, and GB may not be located in an area where the compressive stress is relatively dominant. That is, the first upper grooves GU1 and the second upper grooves GU2 may be respectively defined in the first curvature area CA1 and the third curvature area CA3, and the lower grooves GB may be defined in the second curvature area CA2.

The grooves GU1, GU2, and GB may elongate the upper surface 300U and the lower surface 300B, where the tensile stress is the greatest. This is because the width of the grooves GU1, GU2, and GB increases as the shape of the grooves GU1, GU2, and GB is changed during the folding operation.

As the grooves are not defined in the area where the compressive stress is relatively dominant, it is possible to minimize the occurrence of cracks, which is caused by the compressive stress, in the insulation plate 300 in the process of folding the insulation plate 300. When the grooves or the openings are defined in the area where the compressive stress is relatively dominant, the rigidity of the insulation plate 300 may decrease, and cracks may occur in the insulation plate 300.

Figure 5A:
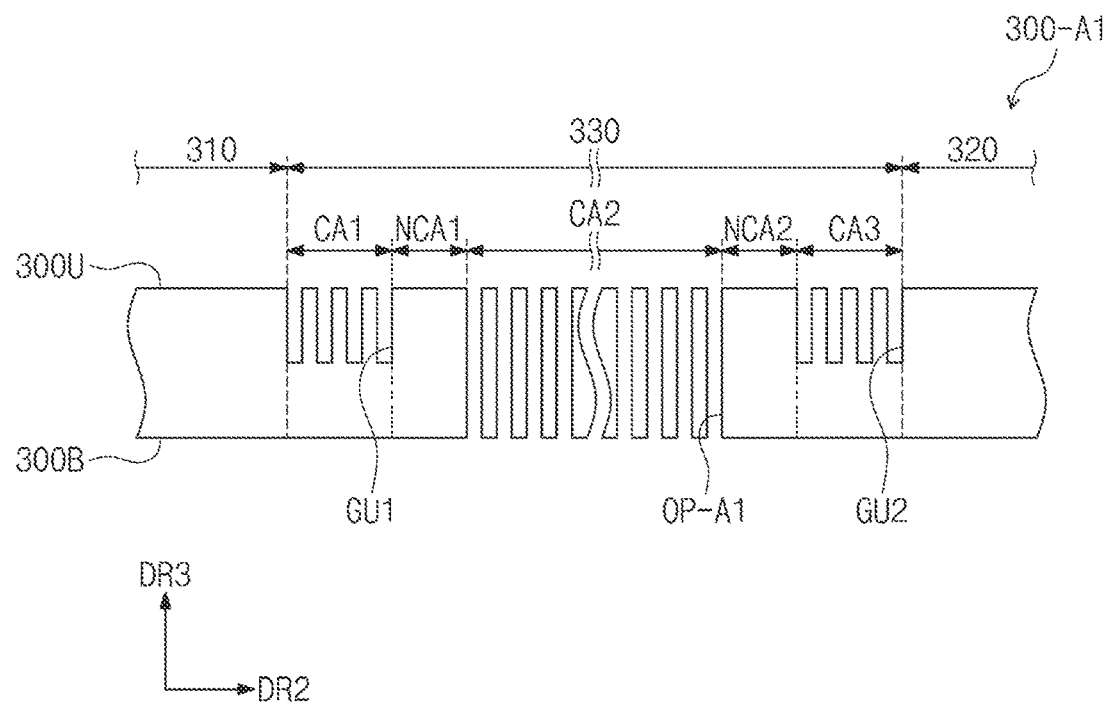
FIG. 5A is a cross-sectional view showing an insulation plate according to some embodiments of the present disclosure.
Figure 5B:
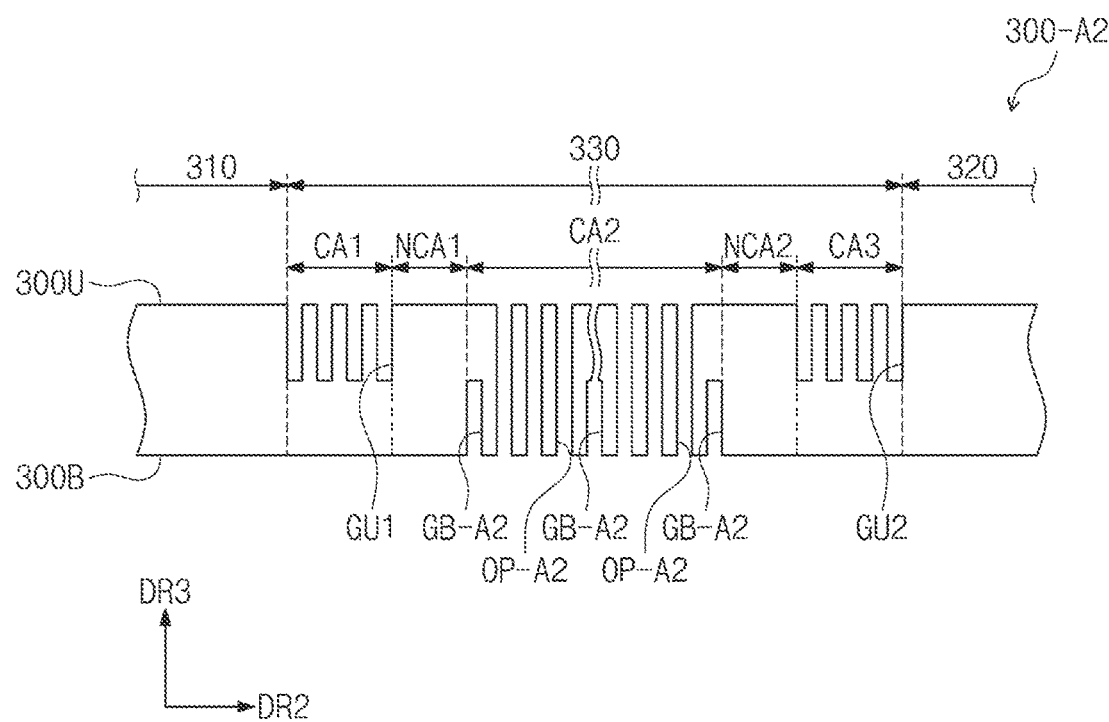
FIG. 5B is a cross-sectional view showing an insulation plate according to some embodiments of the present disclosure.
Figure 5C:
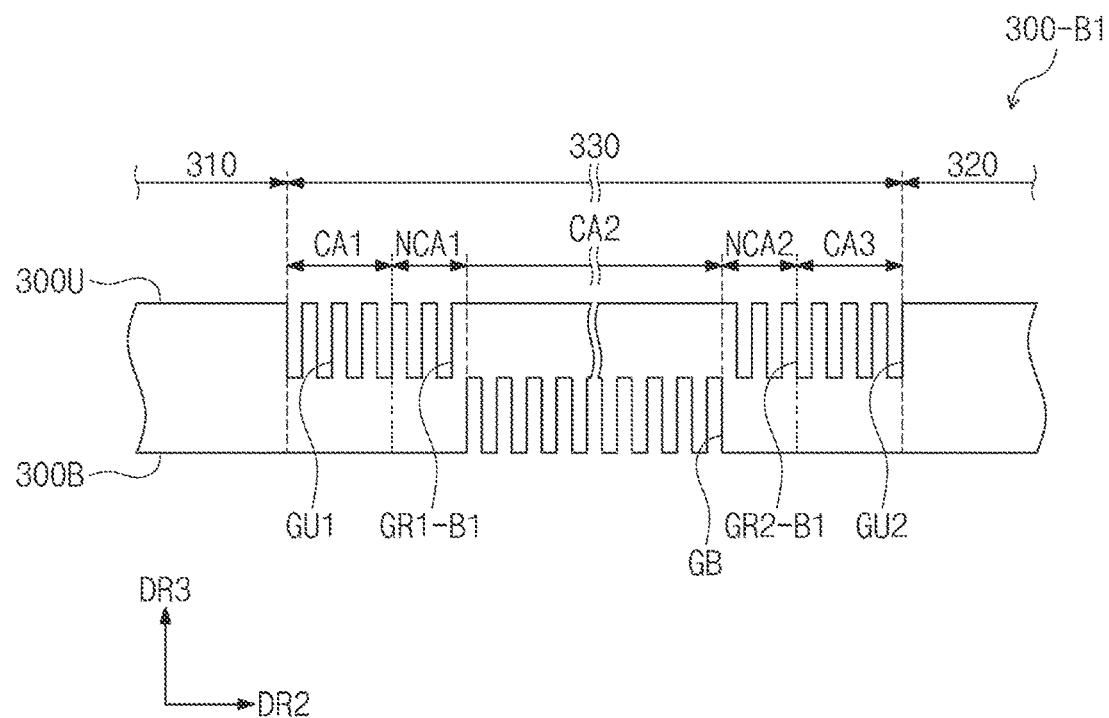
FIG. 5C is a cross-sectional view showing an insulation plate according to some embodiments of the present disclosure.
Figure 5D:
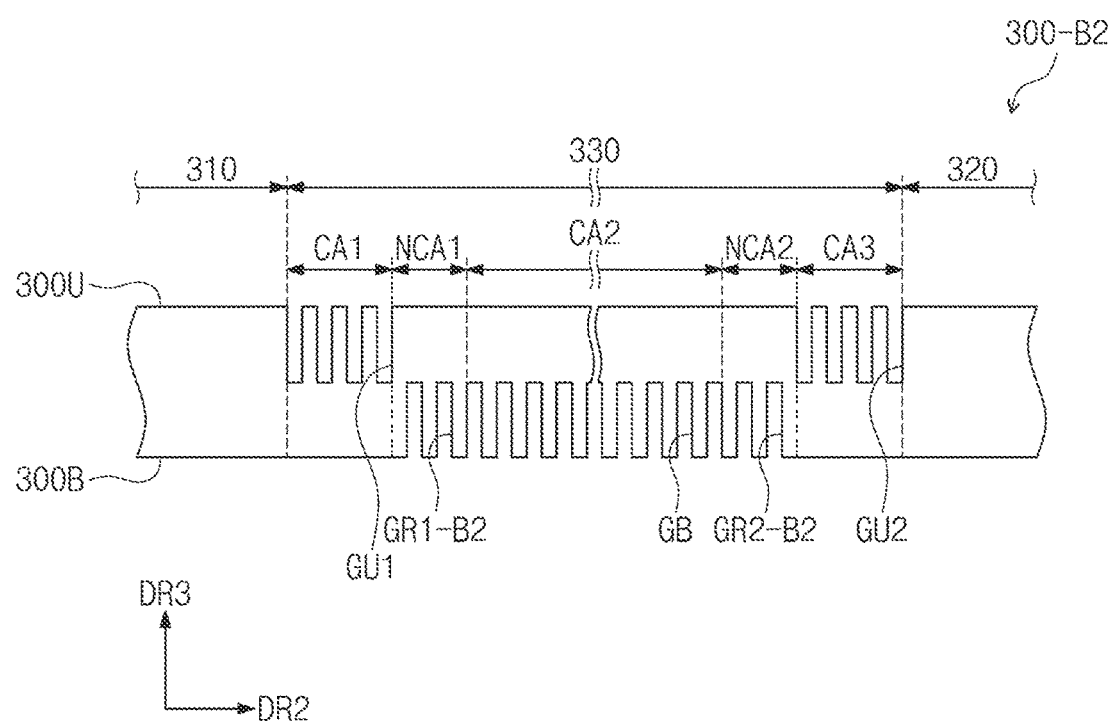
FIG. 5D is a cross-sectional view showing an insulation plate according to some embodiments of the present disclosure.

FIG. 5A is a cross-sectional view showing an insulation plate 300-A1 according to some embodiments of the present disclosure. FIG. 5B is a cross-sectional view showing an insulation plate 300-A2 according to some embodiments of the present disclosure. FIG. 5C is a cross-sectional view showing an insulation plate 300-B1 according to some embodiments of the present disclosure. FIG. 5D is a cross-sectional view showing an insulation plate 300-B2 according to some embodiments of the present disclosure. In FIGS. 5A to 5D, the same and similar elements denote the same and similar elements in FIGS. 1A to 4D, and thus, some detailed descriptions of the same and similar elements may be omitted.

Referring to FIG. 5A, a first curvature area CA1 may include first upper grooves GU1 defined in an upper surface 300U, and a third curvature area CA3 may include second upper grooves GU2 defined in the upper surface 300U. According to some embodiments, a second curvature area CA2 may include openings OP-A1.

According to some embodiments, because the second curvature area CA2 may have a curvature greater than that of the first curvature area CA1 and the third curvature area CA3, a greater stress may be generated in the second curvature area CA2 after a folding operation. In the second curvature area CA2, the greatest tensile stress may be generated in a lower surface 300B.

According to some embodiments, the second curvature area CA2 may include the openings OP-A1 defined through the insulation plate 300-A1 from the lower surface 300B to the upper surface 300U. The openings OP-A1 may improve the flexibility of the second curvature area CA2 more than the lower grooves GB described with reference to FIG. 4B. Accordingly, the openings OP-A1 may prevent or reduce instances of cracks occurring due to high tensile stress.

Referring to FIG. 5B, a second curvature area CA2 of the insulation plate 300-A2 may include lower grooves GB-A2 and openings OP-A2.

However, FIG. 5B merely shows a structure in which the second curvature area CA2 includes a plurality of patterns having different shapes from each other as a representative example, and configurations and arrangements of the lower grooves GB-A2 and the openings OP-A2 should not be limited thereto or thereby.

As an example, the arrangements of the lower grooves GB-A2 and the openings OP-A2 may be controlled according to the stress applied to the second curvature area CA2. As an example, in a case where portions having different curvatures from each other are present in the second curvature area CA2 during the folding operation, cracks caused by high tensile stress may be prevented from occurring when the openings OP-A2 are partially applied to an area with a relatively great curvature.

Referring to the insulation plate 300-B1 shown in FIG. 5C according to some embodiments, patters (e.g., set or predetermined patterns) may be defined in a first non-curvature area NCA1 and a second non-curvature area NCA2.

The first non-curvature area NCA1 and the second non-curvature area NCA2 may respectively include additional grooves GR1-B1 and GR2-B1 defined in an upper surface 300U of the insulation plate 300-B1. The additional grooves GR1-B1 and GR2-B1 may include first additional grooves GR1-B1 defined in the first non-curvature area NCA1 and second additional grooves GR2-B1 defined in the second non-curvature area NCA2.

In the second mode of the display device 1000 (refer to FIG. 1A), the first non-curvature area NCA1 and the second non-curvature area NCA2 may maintain a shape corresponding to the first mode of the display device 1000. Although the mode of the display device 1000 is changed, the first non-curvature area NCA1 and the second non-curvature area NCA2 may have the same shape as that before the mode of the display device 1000 is changed.

According to some embodiments, the non-curvature areas NCA1 and NCA2 may not be formed in the insulation plate 300-B1 during the second mode of the display device 1000. That is, the entire portion of the insulation plate 300-B1 may form a curved surface.

As the non-curvature areas NCA1 and NCA2 are omitted and a first curvature area CA1 is expanded to the first non-curvature area NCA1, a boundary between the first non-curvature area NCA1 and a second curvature area CA2 may be changed to a boundary between the first curvature area CA1 and the second curvature area CA2. In addition, as a third curvature area CA3 is expanded to the second non-curvature area NCA2, a boundary between the second curvature area CA2 and the second non-curvature area NCA2 may be changed to a boundary between the second curvature area CA2 and the third curvature area CA3.

As an example, as a width of the first curvature area CA1 and the third curvature area CA3 whose centers of curvature are formed outside increases, an area in which upper grooves GU1 and GU2 are defined may increase.

Referring to the insulation plate 300-B2 shown in FIG. 5D according to some embodiments, a first non-curvature area NCA1 and a second non-curvature area NCA2 may respectively include additional grooves GR1-B2 and GR2-B2 defined in a lower surface 300B of the insulation plate 300-B2. The additional grooves GR1-B2 and GR2-B2 may include first additional grooves GR1-B2 defined in the first non-curvature area NCA1 and second additional grooves GR2-B2 defined in the second non-curvature area NCA2.

According to some embodiments, the non-curvature areas NCA1 and NCA2 may not be formed in the insulation plate 300-B2 during the second mode of the display device 1000 (refer to FIG. 1A). That is, the entire portion of the insulation plate 300-B2 may form a curved surface.

As the non-curvature areas NCA1 and NCA2 are omitted and a second curvature area CA2 is expanded to the first non-curvature area NCA1 and the second non-curvature area NCA2, a boundary between a first curvature area CA1 and the first non-curvature area NCA1 may be changed to a boundary between the first curvature area CA1 and the second curvature area CA2. In addition, a boundary between the second non-curvature area NCA2 and a third curvature area CA3 may be changed to a boundary between the second curvature area CA2 and the third curvature area CA3.

Compared with the insulation plate 300-B1 shown in FIG. 5C, a width of the second curvature area CA2 whose center of curvature is formed inside may increase. Accordingly, a width of an area in which lower grooves GB are defined may increase.

Figure 6A:
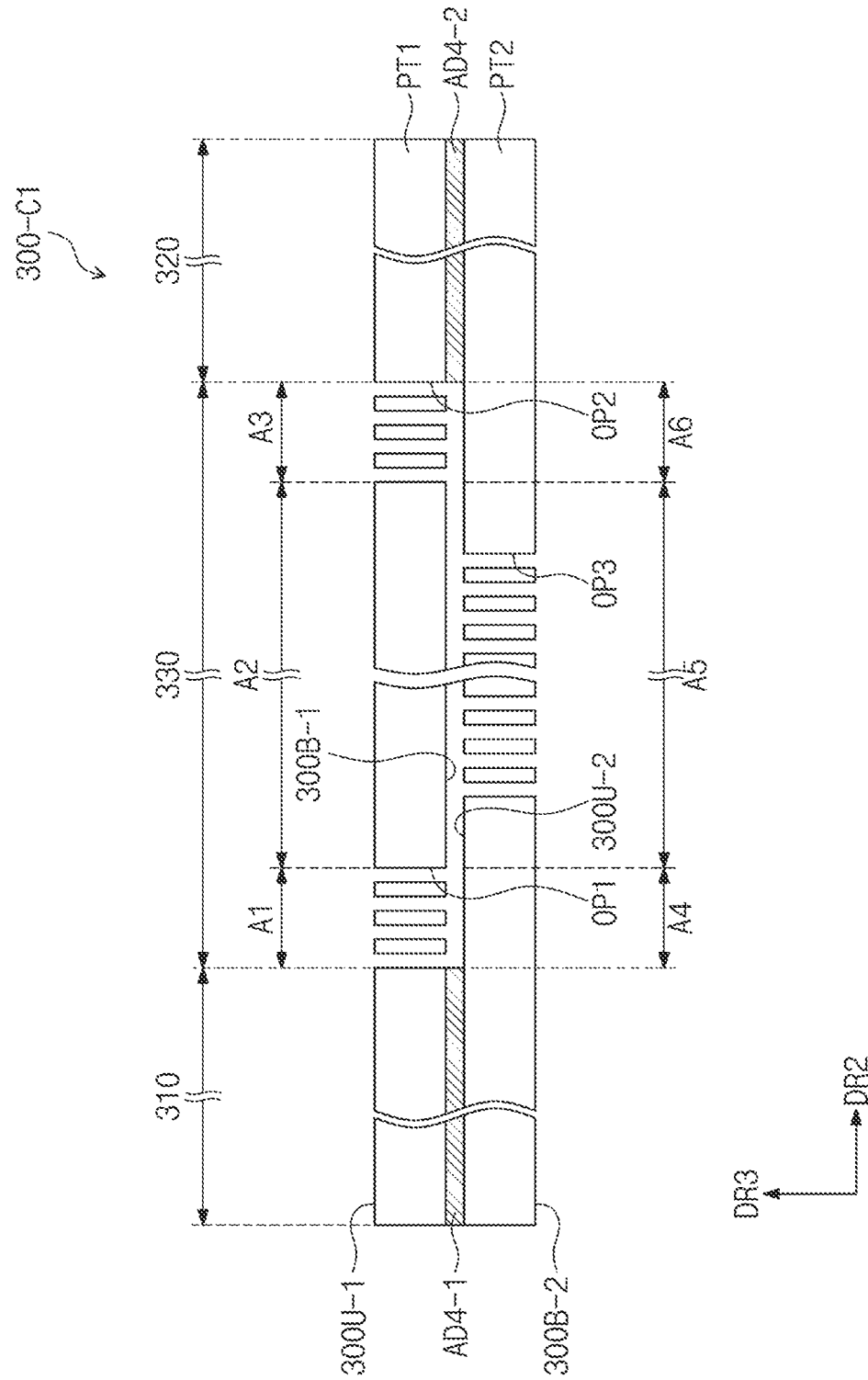
FIG. 6A is a cross-sectional view showing an insulation plate according to some embodiments of the present disclosure.
Figure 6B:
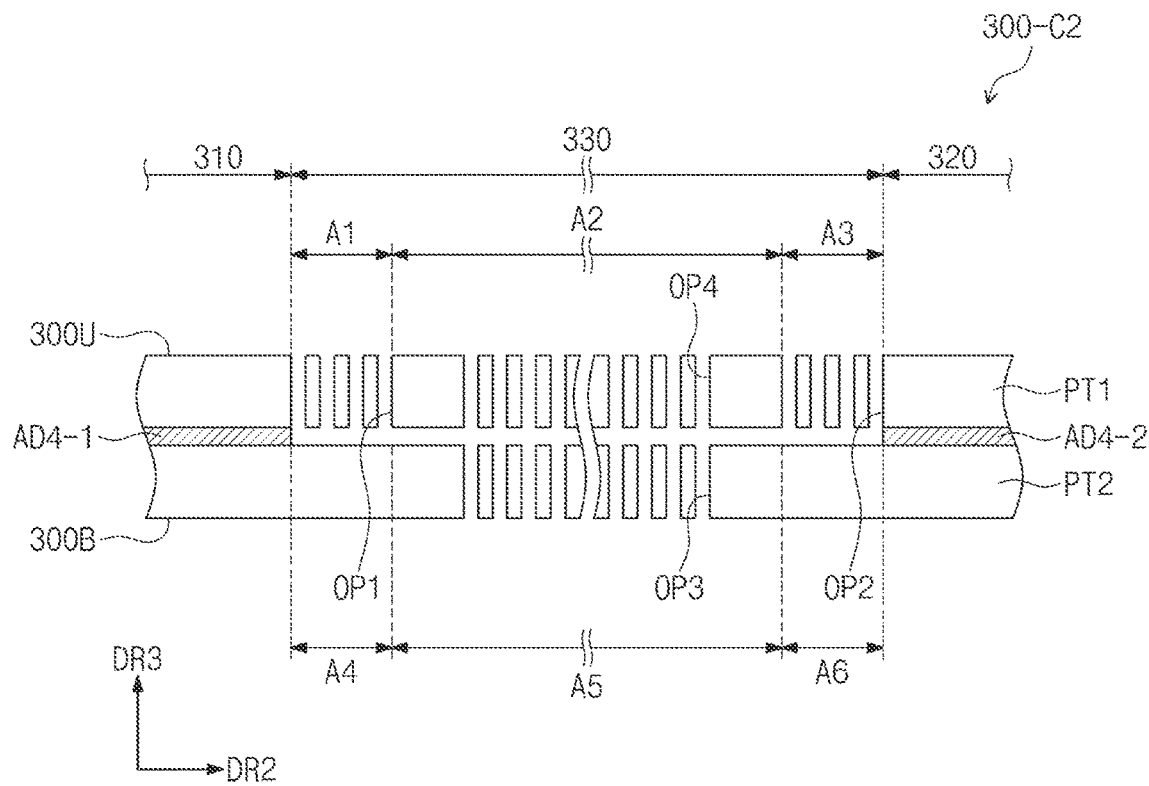
FIG. 6B is a cross-sectional view showing an insulation plate according to some embodiments of the present disclosure.
Figure 6C:
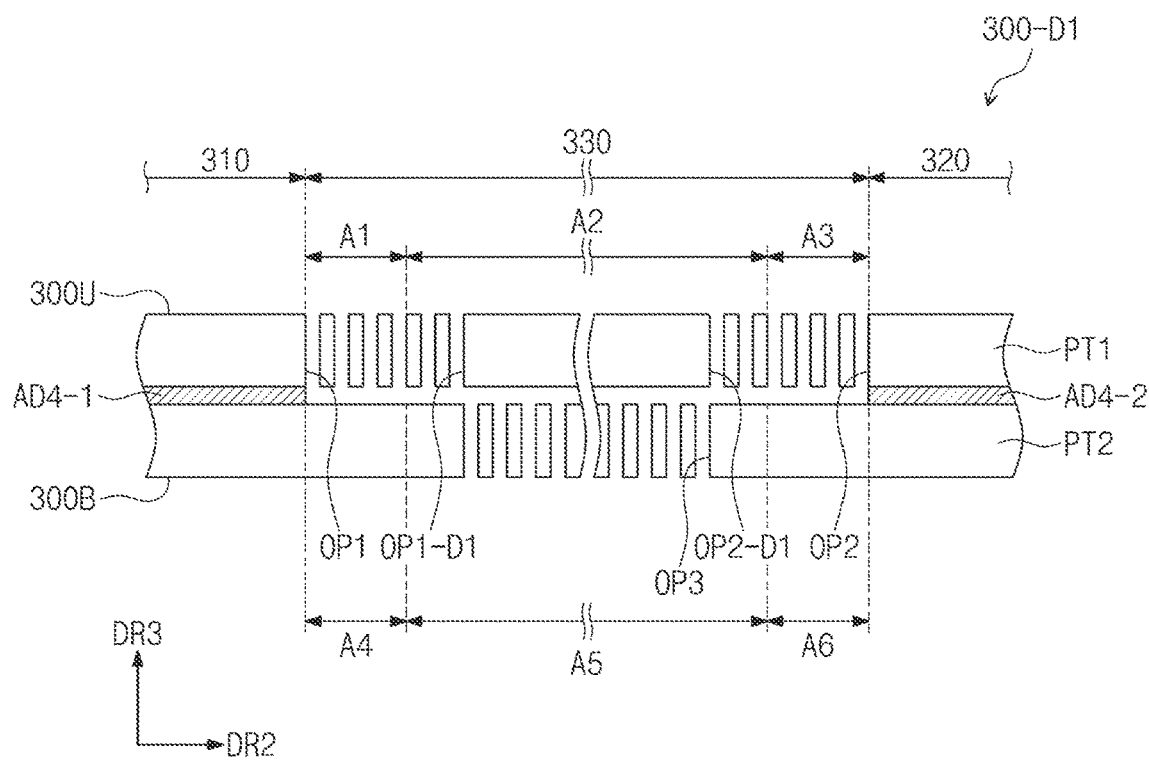
FIG. 6C is a cross-sectional view showing an insulation plate according to some embodiments of the present disclosure.
Figure 6D:
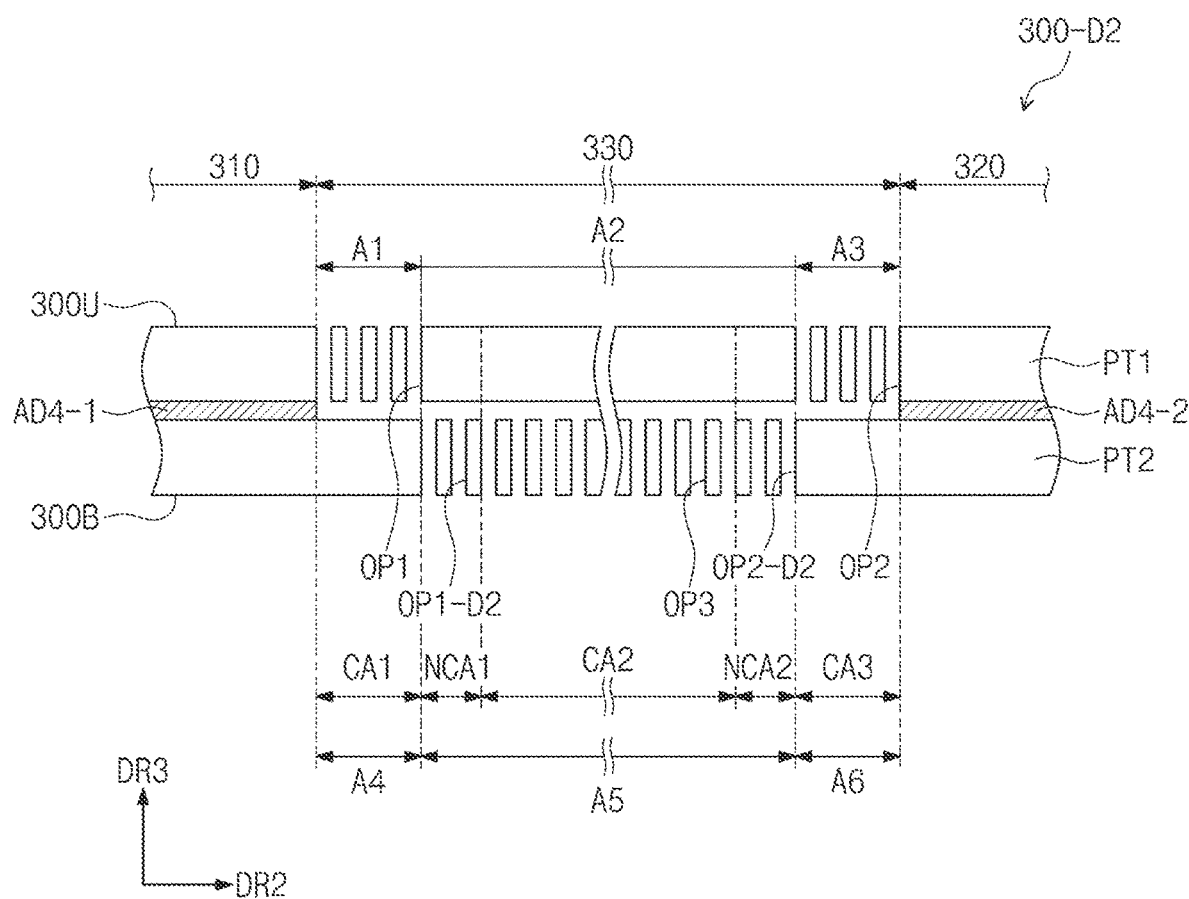
FIG. 6D is a cross-sectional view showing an insulation plate according to some embodiments of the present disclosure.

FIG. 6A is a cross-sectional view showing an insulation plate 300-C1 according to some embodiments of the present disclosure. FIG. 6B is a cross-sectional view showing an insulation plate 300-C2 according to some embodiments of the present disclosure. FIG. 6C is a cross-sectional view showing an insulation plate 300-D1 according to some embodiments of the present disclosure. FIG. 6D is a cross-sectional view showing an insulation plate 300-D2 according to some embodiments of the present disclosure. Different from the insulation plates 300, 300-A1, 300-A2, 300-B1, and 300-B2 described with reference to FIGS. 4B and 5A to 5D, the insulation plates 300-C1, 300-C2, 300-D1, and 300-D2 of FIGS. 6A to 6D may include a plurality of plates. Each of the insulation plates 300-C1, 300-C2, 300-D1, and 300-D2 shown in FIGS. 6A to 6D may include two plates. In FIGS. 6A to 6D, the same and similar reference numerals denote the same and similar elements in FIGS. 1A to 5D, and thus, detailed descriptions of the same and similar elements will be omitted.

Referring to FIG. 6A, the insulation plate 300-C1 may include a first plate PT1 and a second plate PT2. The second plate PT2 may be located under the first plate PT1. Each of the first plate PT1 and the second plate PT2 may include a first support portion 310, a second support portion 320, and a folding portion 330.

The first plate PT1 and the second plate PT2 may be coupled to each other by fourth adhesive layers AD4-1 and AD4-2. The fourth adhesive layers AD4-1 and AD4-2 may be located between the first plate PT1 and the second plate PT2. The fourth adhesive layers AD4-1 and AD4-2 may include a first portion AD4-1 overlapping the first support portion 310 and a second portion AD4-2 overlapping the second support portion 320.

According to some embodiments, the fourth adhesive layers AD4-1 and AD4-2 may overlap at least a portion of the first support portion 310 and at least a portion of the second support portion 320, respectively. Referring to FIG. 4A, consequently, the fourth adhesive layers AD4-1 and AD4-2 may overlap at least a portion of the first non-folding area NFA1 and at least a portion of the second non-folding area NFA2, respectively. It is sufficient that the fourth adhesive layers AD4-1 and AD4-2 are arranged to couple the first plate PT1 and the second plate PT2.

Accordingly, when the insulation plate 300-C1 is in an unfolded state, the folding portion 330 of the first plate PT1 and the folding portion 330 of the second plate PT2 may be spaced apart from each other in the third direction DR3. Referring to FIG. 6A, consequently, the first plate PT1 and the second plate PT2 may be spaced apart from each other along a thickness direction of the insulation plate 300-C1 in the folding area FA. As the fourth adhesive layers AD4-1 and AD4-2 are not located in the folding portion 330, the folding portion 330 of the first plate PT1 and the folding portion 330 of the second plate PT2 may be folded without being interfered.

Although the fourth adhesive layers AD4-1 and AD4-2 are not located in the folding portion 330, the first plate PT1 and the second plate PT2 may be in the coupled state. Accordingly, when the folding area FA is folded, the folding portion 330 of the first plate PT1 and the folding portion 330 of the second plate are considered the same as being coupled to each other in terms of stress. Although a neutral plane is formed in each of the folding portion 330 of the first plate PT1 and the folding portion 330 of the second plate PT2 when the folding area FA is folded, the neutral plane of the first plate PT1 and the neutral plane of the second plate PT2 may have different conditions from each other. This will be described in detail later.

The folding portion 330 of the first plate PT1 may include a first area A1, a second area A2, and a third area A3, which are sequentially arranged from the first support portion 310 along the second direction DR2. According to some embodiments, the first area A1 may correspond to the first curvature area CA1 (refer to FIG. 4C). The third area A3 may correspond to the third curvature area CA3 (refer to FIG. 4C). The second area A2 may correspond to the first non-curvature area NCA1 (refer to FIG. 4C), the second curvature area CA2 (refer to FIG. 4C), and the second non-curvature area NCA2 (refer to FIG. 4C).

The first area A1 and the third area A3 may correspond to the first tension area CT1 and the third tension area CT3 of FIG. 4C, respectively. In the first area A1 and the third area A3, the tensile stress may be dominant over the compressive stress. On the other hand, the second area A2 may correspond to the second compression area CC2 of FIG. 4C. In the second area A2, the compressive stress may be dominant over the tensile stress.

The neutral plane may be positioned close to a lower surface 300B-1 of the first plate PT1 in each of the first area A1 and the third area A3 of the first plate PT1. In the second area A2, the neutral plane may be positioned close to the lower surface 300B-1 of the first plate PT1.

According to some embodiments, first openings OP1 may be defined in the first area A1. Second openings OP2 may be defined in the third area A3. The first openings OP1 and the second openings OP2 may be deformed by the tensile stress when the folding portion 330 of the first plate PT1 is folded. The first openings OP1 may provide the flexibility to the first area A1, and the second openings OP2 may provide the flexibility to the third area A3. In addition, because the patterns are not located in the second area A2, cracks caused by compressive stress may be suppressed even though a relatively large compressive stress is applied.

The second plate PT2 may include a fourth area A4, a fifth area A5, and a sixth area A6 in the folding portion 330. The fourth area A4 may correspond to the first area A1. The fifth area A5 may correspond to the second area A2. The sixth area A6 may correspond to the third area A3.

Third openings OP3 may be defined in a portion of the fifth area A5. A width of an area in which the third openings OP3 are defined in the fifth area A5 may be smaller than a width of the second area A2. The area in which the third openings OP3 are defined may be arranged at a center of the fifth area A5. The area in which the third openings OP3 are defined may correspond to the second curvature area CA2 of FIG. 4C.

The area in which the third openings OP3 are defined may correspond to the second tension area CT2 of FIG. 4C, and the tensile stress may be dominant over the compressive stress. On the other hand, the fourth area A4 and the sixth area A6 may correspond to the first compression area CC1 and the third compression area CC3 of FIG. 4C, and the compressive stress may be dominant over the tensile stress. The neutral plane may be positioned close to an upper surface 300U-2 of the second plate PT2 in the fifth area A5. The neutral plane may be positioned close to the upper surface 300U-2 of the second plate PT2 in each of the fourth area A4 and the sixth area A6.

The third openings OP3 may be deformed by the tensile stress when the folding portion 330 of the second plate PT2 is folded. The third openings OP3 may provide the flexibility to the fifth area A5. In addition, because the patterns are not located in each of the fourth area A4 and the sixth area A6, cracks caused by compressive stress may be suppressed even though a relatively large compressive stress is applied.

According to some embodiments, the first plate PT1 and the second plate PT2 may include different materials from each other. As an example, the first plate PT1 may include a glass material, and the second plate PT2 may include a plastic material. When compared with the first plate PT1, a size of an area to which the tensile stress is applied, e.g., the fifth area A5, is larger in the second plate PT2. Accordingly, the second plate PT2 may include the plastic material having a relatively larger flexibility than that of the glass material. On the other hand, because the first plate PT1 is located closer to the window 500 (refer to FIG. 3A) compared with the second plate PT2, the first plate PT1 may have a relatively greater influence on the feel of touch of the user. The first plate PT1 may include the glass material with higher rigidity than that of the plastic material to give the user a hard touch feeling.

Referring to FIG. 6B, the insulation plate 300-C2 may further include fourth openings OP4 defined in a second area A2.

According to some embodiments, the fourth openings OP4 may be defined in a portion of the second area A2. A width of an area in which the fourth openings OP4 are defined may be substantially the same as a width of an area in which third openings OP3 are defined. That is, the area in which the fourth openings OP4 are defined may correspond to the second curvature area CA2 of FIG. 4C.

Referring to the insulation plate 300-D1 shown in FIG. 6C according to some embodiments, additional openings OP1-D1 and OP2-D1 may be defined in a portion of a second area A2. The additional openings OP1-D1 and OP2-D1 may be defined in an area that does not overlap an area in which third opening OP3 are defined. The area in which the additional openings OP1-D1 and OP2-D1 are defined may correspond to the first non-curvature area NCA1 and the second non-curvature area NCA2 of FIG. 4C.

The additional openings OP1-D1 and OP2-D1 may include first additional openings OP1-D1 defined in the first non-curvature area NCA1 and second additional openings OP2-D1 defined in the second non-curvature area NCA2.

Referring to the insulation plate 300-D2 shown in FIG. 6D according to some embodiments, additional openings OP1-D2 and OP2-D2 may be defined in a portion of a fifth area A5. The additional openings OP1-D2 and OP2-D2 may be defined in the other area of the fifth area A5 except the areas in which the third openings OP3 are defined. The area in which the additional openings OP1-D2 and OP2-D2 are defined may correspond to the first non-curvature area NCA1 and the second non-curvature area NCA2 described with reference to FIG. 4C. For the convenience of explanation, areas defined when the insulation plate 300 shown in FIG. 4C is folded are additionally shown in FIG. 6D.

The additional openings OP1-D2 and OP2-D2 may include first additional openings OP1-D2 defined in the first non-curvature area NCA1 and second additional openings OP2-D2 defined in the second non-curvature area NCA2.

According to some embodiments, non-curvature areas NCA1 and NCA2 may not be formed in the insulation plate 300-D2 during the second mode of the display device 1000 (refer to FIG. 1A). That is, the entire portion of the insulation plate 300-D2 may form a curved surface.

The non-curvature areas NCA1 and NCA2 may be omitted, and each of a boundary between a first area A1 and a second area A2 and a boundary between a fourth area A4 and the fifth area A5 may be changed to a boundary between a first curvature area CA1 and a second curvature area CA2. In addition, each of a boundary between the second area A2 and a third area A3 and a boundary between the fifth area A5 and a sixth area A6 may be changed to a boundary between the second curvature area CA2 and a third curvature area CA3.

As an example, as a width of the second curvature area CA2 whose center of curvature is formed inside increases, a width of the area in which the third openings OP3 are defined may increase, however, it should not be limited thereto or thereby. According to some embodiments, as a width of the first curvature area CA1 and the third curvature area CA3 whose centers of curvature are formed outside increases, a width of areas in which first openings OP1 and second opening OP2 are respectively defined may increase.

Although aspects of some embodiments of the present disclosure have been described, it is understood that embodiments according to the present disclosure should not be limited to these embodiments but various changes and modifications can be made by one ordinary skilled in the art within the spirit and scope of embodiments according to the present disclosure as hereinafter claimed.

Therefore, the disclosed subject matter should not be limited to any single embodiment described herein, and the scope of embodiments according to the present inventive concept shall be determined according to the attached claims, and their equivalents.

What is claimed is:

1. A display device comprising:
    a display panel comprising a first non-folding area, a second non-folding area, and a folding area between the first non-folding area and the second non-folding area, wherein the display device is configured to operate in a first mode in an unfolded state, and the display device is configured to operate in a second mode in a folded state; and
    an insulation plate under the display panel and comprising a folding portion corresponding to the folding area, the folding portion comprising:
    a first area;
    a second area further away from the first non-folding area than the first area is; and a third area closer to the second non-folding area than the second area is, wherein each of the first area and the third area comprises a first stress control pattern comprising first grooves defined in an upper surface of the insulation plate, and the second area comprises a second stress control pattern comprising at least one of second grooves or openings defined in a lower surface of the insulation plate, wherein the lower surface of the insulation plate defines one plane in the first non-folding area and the first area and defines one plane in the second non-folding area and the third area.

2. The display device of claim 1, wherein the folding portion further comprises fourth and fifth areas respectively between the first area and the second area and between the second area and the third area.

3. The display device of claim 2, wherein the lower surface of the insulation plate defines one plane in the first non-folding area, the first area, and the fourth area and defines one plane in the second non-folding area, the third area, and the fifth area.

4. The display device of claim 1, wherein the first grooves of each of the first and third areas are arranged in a lattice shape in a plan view, and the second grooves or the openings of the second area are arranged in a lattice shape in the plan view.

5. The display device of claim 1, wherein the insulation plate comprises at least one of plastic, fiberglass reinforced plastic, or glass.

6. The display device of claim 1, further comprising a digitizer under the insulation plate.

7. The display device of claim 6, wherein the digitizer comprises:
a first digitizer overlapping the first non-folding area; and
a second digitizer overlapping the second non-folding area and independently driven from the first digitizer.

8. The display device of claim 7, further comprising:
a first metal plate on a lower surface of the first digitizer; and
a second metal plate on a lower surface of the second digitizer and spaced apart from the first metal plate.

9. A display device comprising:
a display panel comprising a first non-folding area, a second non-folding area, and a folding area between the first non-folding area and the second non-folding area, wherein the display device is configured to operate in a first mode in an unfolded state, and to operate in a second mode in a folded state; and
an insulation plate under the display panel and comprising an upper surface and a lower surface corresponding to the upper surface,
the insulation plate comprising a folding portion corresponding to the folding area, the folding portion, in a state where the insulation plate is folded to correspond to the second mode of the display panel, comprising:
a first curvature area having a first curvature with respect to a first axis defined outside the folding portion, wherein the first axis is adjacent to the lower surface of the insulation plate;
a second curvature area further away from the first non-folding area than the first curvature area is and having a second curvature greater than the first curvature with respect to a second axis defined inside the folding portion, wherein the second axis is adjacent to the upper surface of the insulation plate;
a third curvature area closer to the second non-folding area than the second curvature area is and having a third curvature with respect to a third axis defined outside the folding portion, wherein the third axis is adjacent to the lower surface of the insulation plate;
a first non-curvature area between the first curvature area and the second curvature area; and
a second non-curvature area between the second curvature area and the third curvature area, wherein each of the first curvature area and the third curvature area comprises a first stress control pattern comprising first grooves in the upper surface of the insulation plate, and the second curvature area comprises a second stress control pattern comprising at least one of second grooves or openings in the lower surface of the insulation plate.

10. The display device of claim 9, wherein the lower surface of the insulation plate extends consecutively in the first non-folding area, the first curvature area, and the first non-curvature area, and the lower surface of the insulation plate extends consecutively in the second non-folding area, the third curvature area, and the second non-curvature area.

11. The display device of claim 9, wherein the third curvature is the same as the first curvature and is smaller than the second curvature.

12. The display device of claim 9, wherein a radius of curvature of the second curvature area is greater than a distance between the first non-folding area and the second non-folding area in a state where the insulation plate is folded.

13. The display device of claim 9, further comprising a digitizer under the insulation plate.

14. A display device comprising:
a display panel comprising a first non-folding area, a second non-folding area, and a folding area between the first non-folding area and the second non-folding area, unfolded in a first mode, and folded in a second mode; and
an insulation plate under the display panel and comprising a first plate and a second plate under the first plate,
each of the first plate and the second plate comprising a folding portion corresponding to the folding area, the folding portion of the first plate comprising:
a first area in which first openings are defined;
a second area further away from the first non-folding area than the first area is; and
a third area closer to the second non-folding area than the second area is and provided with second openings defined therein, and the folding portion of the second plate comprising:
a fourth area corresponding to the first area;
a fifth area corresponding to the second area and having third openings defined therein; and
a sixth area corresponding to the third area, wherein the folding portion of the first plate and the folding portion of the second plate overlap each other in a thickness direction of the insulation plate in the first mode.

15. The display device of claim 14, wherein an area of the fifth area in which the third openings are defined has a width equal to or smaller than a width of the second area.

16. The display device of claim 14, wherein, in a state where the insulation plate is folded to correspond to the second mode of the display panel, each of the first area and the fourth area has a first curvature, at least a portion of each of the second area and the fifth area has a second curvature, each of the third area and the sixth area has a third curvature, and the first curvature is greater than the second curvature and is the same as the third curvature.

17. The display device of claim 14, wherein the insulation plate further comprises an adhesive layer between the first plate and the second plate.

18. The display device of claim 17, wherein the adhesive layer overlaps at least a portion of each of the first non-folding area and the second non-folding area.

19. The display device of claim 17, wherein, in a state where the insulation plate is unfolded to correspond to the first mode of the display panel, the first plate and the second plate are spaced apart from each other along a thickness direction of the insulation plate in the folding area.

20. The display device of claim 14, wherein the first plate further comprises fourth openings in the second area.

21. The display device of claim 20, wherein an area of the second area in which the fourth openings are defined has a width equal to a width of an area of the fifth area in which the third openings are defined.

22. The display device of claim 14, wherein the first plate comprises a material having a rigidity higher than a rigidity of the second plate.

23. The display device of claim 14, further comprising a digitizer under the insulation plate.

\* \* \* \* \*